(12) United States Patent
Oshima et al.

(10) Patent No.: US 12,059,819 B2
(45) Date of Patent: Aug. 13, 2024

(54) CERAMICS PRODUCT MANUFACTURING METHOD AND CERAMICS PRODUCT

(71) Applicant: CANON KABUSHIKI KAISHA, Tokyo (JP)

(72) Inventors: Kanako Oshima, Tokyo (JP); Nobuhiro Yasui, Yokohama (JP); Hisato Yabuta, Machida (JP); Makoto Kubota, Yokohama (JP); Yoshinori Kotani, Yokohama (JP); Yoshihiro Ohashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 711 days.

(21) Appl. No.: 17/076,328

(22) Filed: Oct. 21, 2020

(65) Prior Publication Data
US 2021/0031403 A1   Feb. 4, 2021

Related U.S. Application Data
(63) Continuation of application No. PCT/JP2019/017244, filed on Apr. 23, 2019.

(30) Foreign Application Priority Data

Apr. 24, 2018  (JP) ................. 2018-083110
Apr. 22, 2019  (JP) ................. 2019-081158

(51) Int. Cl.
| | |
|---|---|
| *B33Y 10/00* | (2015.01) |
| *B28B 1/00* | (2006.01) |
| *B28B 11/04* | (2006.01) |
| *B33Y 40/20* | (2020.01) |
| *B33Y 70/00* | (2020.01) |
| *B33Y 80/00* | (2015.01) |
| *C04B 35/119* | (2006.01) |
| *C04B 35/14* | (2006.01) |
| *C04B 35/628* | (2006.01) |
| *C04B 35/632* | (2006.01) |
| *C04B 35/64* | (2006.01) |
| *C04B 35/653* | (2006.01) |

(52) U.S. Cl.
CPC .......... *B28B 1/001* (2013.01); *B28B 11/048* (2013.01); *B33Y 10/00* (2014.12); *B33Y 40/20* (2020.01); *B33Y 70/00* (2014.12); *B33Y 80/00* (2014.12); *C04B 35/119* (2013.01); *C04B 35/14* (2013.01); *C04B 35/62886* (2013.01); *C04B 35/632* (2013.01); *C04B 35/64* (2013.01); *C04B 35/653* (2013.01); *C04B 2235/3217* (2013.01); *C04B 2235/3222* (2013.01); *C04B 2235/3224* (2013.01); *C04B 2235/3244* (2013.01); *C04B 2235/3418* (2013.01); *C04B 2235/5436* (2013.01); *C04B 2235/6026* (2013.01); *C04B 2235/616* (2013.01); *C04B 2235/665* (2013.01)

(58) Field of Classification Search
None
See application file for complete search history.

(56) References Cited

U.S. PATENT DOCUMENTS

| | | | |
|---|---|---|---|
| 5,675,181 A | 10/1997 | Nishiura et al. | |
| 7,598,188 B2 | 10/2009 | Rosenflanz et al. | |
| 9,556,525 B2 | 1/2017 | Dierkes et al. | |
| 9,642,247 B2 | 5/2017 | Schmidt et al. | |
| 9,994,487 B2 | 6/2018 | Ide et al. | |
| 10,759,712 B2 | 9/2020 | Yasui et al. | |
| 2004/0247479 A1 | 12/2004 | Spencer | |
| 2012/0237745 A1* | 9/2012 | Dierkes | C04B 35/4885 427/532 |
| 2015/0135897 A1 | 5/2015 | Sutcliffe et al. | |
| 2015/0316691 A1* | 11/2015 | Nakayama | G02B 1/041 428/319.3 |
| 2017/0014910 A1 | 1/2017 | Ng et al. | |
| 2017/0057876 A1* | 3/2017 | Montanaro | C04B 35/488 |
| 2018/0057411 A1 | 3/2018 | Yoshikawa et al. | |
| 2019/0134893 A1 | 5/2019 | Yabuta et al. | |
| 2020/0140340 A1 | 5/2020 | Yasui et al. | |
| 2020/0346982 A1 | 11/2020 | Yasui et al. | |

FOREIGN PATENT DOCUMENTS

| | | |
|---|---|---|
| CN | 1958196 A | 5/2007 |
| CN | 101351420 A | 1/2009 |
| CN | 102574204 A | 7/2012 |

(Continued)

OTHER PUBLICATIONS

First Office Action in Chinese Application No. 201980035063.1 (Jul. 2021).
Second Office Action in Chinese Application No. 201980035063.1 (Jan. 2022).
Yves-Christian Hagedorn et al., "Net Shaped high Performance Oxide Ceramic Parts by Selective Laser Melting," 5 Physics Procedia 587-594 (2010) (XP055389896).

(Continued)

*Primary Examiner* — Mohammad M Ameen
(74) *Attorney, Agent, or Firm* — Venable LLP

(57) ABSTRACT

Provided are a method of manufacturing a ceramic article in which the improvement of mechanical strength, wear resistance, and machinability is achieved using a direct modeling system, and a ceramic article. The manufacturing method includes the steps of: (i) arranging powder containing ceramics as a main component on a base; (ii) irradiating a part or an entirety of the arranged powder with an energy beam to melt and solidify the powder, to thereby obtain an intermediate modeled article; (iii) causing the modeled article to absorb a metal component-containing liquid to impregnate the modeled article therewith; and (iv) subjecting the modeled article having absorbed the metal component-containing liquid to heat treatment.

20 Claims, 10 Drawing Sheets

(56) References Cited

FOREIGN PATENT DOCUMENTS

| | | | |
|---|---|---|---|
| CN | 102850043 | A | 1/2013 |
| CN | 104507601 | A | 4/2015 |
| CN | 104755445 | A | 7/2015 |
| CN | 107001147 | A | 8/2017 |
| CN | 107140959 | A | 9/2017 |
| CN | 107140960 | A | 9/2017 |
| CN | 107663081 | A | 2/2018 |
| EP | 3 431 459 | A1 | 1/2019 |
| JP | 62-113781 | A | 5/1987 |
| JP | 8-195450 | A | 7/1996 |
| JP | 2001-017907 | A | 1/2001 |
| JP | 2013-501701 | A | 1/2013 |
| JP | 2016-204244 | A | 12/2016 |
| WO | 2011/018463 | A1 | 2/2011 |
| WO | 2019/208570 | A1 | 10/2019 |

OTHER PUBLICATIONS

International Search Report in International Application No. PCT/JP2019/017244 (Jul. 2019).
M. Schehl et al., "Alumina Nanocomposites from Powder-Alkoxide Mixtures," 50 Acta Materialia 1125-1139 (2002) (XP027395760).
Haijun Su et al., "Preparation and Characterization of Al2O3/Y3Al5O12/ZrO2 Ternary Hypoeutectic in situ Composites by Laser Rapid Solidification," 104 J. Appl. Phys. 023511: 1-7 (Jul. 2008) (XP012116931).
Y. Waku et al., "Temperature Dependence of Flexural Strength and Microstructure of Al2O3/Y3Al5O12/ZrO2 Ternary Melt Growth Composites," 37 J. Mater. Sci. 2975-2982 (2002) (XP019209642).
Communication Pursuant to Rule 62 EPC in European Application No. 19791494.8 (Mar. 2022).
International Preliminary Report on Patentability in International Application No. PCT/JP2019/017244 (Nov. 2020).
Suherlan et al., "Temperature Determination of the Si—SiC Eutectic Fixed Point Using Thermocouples," 52 (2) Metrologia 330-336 (Mar. 2015) (XP020282026).
Communication Pursuant to Rule 164(1) EPC in European Application No. 19791494.8 (Nov. 2021).
CN 102574204, U.S. Pat. No. 9,556,525 B2.
JP 8-195450, U.S. Pat. No. 5,675,181.
CN 104507601, 2015/0135897 A1.
CN 104755445, U.S. Pat. No. 9,642,247 B2.
Xue-song Fu et al., "Microstructure Refinement Approaches of Melt-Grown Al2O3/YAG/ZrO2 Eutectic Bulk," 39 Ceram. Int. 7445-7452 (2013).
Ruyao Zhou et al., "Research Process in Additive Manufacturing Technology of Ceramic Material," 30(1) Material Guide A: Review 67-72 (Jan. 2016).
JP 2013-501701, WO 2011/018463 A1.
JP 2016-204244, U.S. Pat. No. 9,994,487 B2.
Notice of Reasons for Refusal in Japanese Application No. 2023-070151 (Jun. 2024).

\* cited by examiner 0.5mm 0.5mm

CERAMICS PRODUCT MANUFACTURING METHOD AND CERAMICS PRODUCT

CROSS-REFERENCE TO RELATED APPLICATIONS

This application is a Continuation of International Patent Application No. PCT/JP2019/017244, filed Apr. 23, 2019, which claims the benefit of Japanese Patent Application No. 2018-083110, filed Apr. 24, 2018, and Japanese Patent Application No. 2019-081158 filed Apr. 22, 2019, all of them are hereby incorporated by reference herein in their entirety.

BACKGROUND OF THE INVENTION

Field of the Invention

The present invention relates to a method of manufacturing a ceramic article through use of an additive modeling technology, and a ceramic article manufactured by the manufacturing method.

Description of the Related Art

In applications in which prototypes are produced in a short period of time or a small number of components are manufactured, there has been widely used an additive modeling technology of obtaining a desired modeled article by irradiating material powder with an energy beam based on three-dimensional data on an object to be modeled to combine the material powder. In modeling using metal powder (metal modeling), a powder bed laser direct modeling system has been widely adopted, and dense and diverse metal modeled articles have been obtained. The high denseness of the metal modeled article is achieved by effectively melting and solidifying the metal powder. Based on the success of such metal modeling, the development of the additive modeling technology to ceramic materials has been discussed, and a large number of attempts have been reported.

However, unlike metals, general ceramics, such as aluminum oxide and zirconium oxide, have low absorption ability with respect to laser light. Therefore, in order to melt the general ceramics in the same manner as in metals, it is required to input more energy. However, laser light is diffused, and melting becomes non-uniform. Therefore, it is difficult to obtain the required modeling accuracy.

Under such circumstances, for example, in Physics Procedia 5 (2010) 587-594, there is disclosed a technology of suppressing the occurrence of cracks in a modeled article to be obtained by decreasing a melting point through use of ceramics having an $Al_2O_3$—$ZrO_2$ eutectic composition to reduce energy required for melting, to thereby alleviate thermal stress.

However, in Physics Procedia 5 (2010) 587-594, the modeled article has a phase separation structure peculiar to a eutectic system. Therefore, the modeled article is excellent in mechanical strength, such as three-point bending strength, but a part of ceramic material powder on the periphery of the modeled article heated with a heater is melted, and hence the modeling accuracy is extremely low.

The present invention has been made in order to solve the above-mentioned problem, and provides a method of manufacturing a ceramic article in which the improvement of the mechanical strength of a modeled article is achieved while the high modeling accuracy is achieved in a direct modeling system.

SUMMARY OF THE INVENTION

According to one aspect of the present invention, there is provided a method of manufacturing a ceramic article including the steps of:
(i) arranging powder containing ceramics as a main component on a base;
(ii) irradiating a part or an entirety of the arranged powder with an energy beam to melt and solidify the powder, to thereby obtain a modeled article;
(iii) causing the modeled article to absorb a metal component-containing liquid; and
(iv) heating the modeled article having absorbed the metal component-containing liquid.

According to another aspect of the present invention, there is provided a ceramic article including a ceramic modeled article having a phase separation structure formed of at least three phases of an X-phase, a Y-phase, and a Z-phase,
wherein the three phases are made of materials having a eutectic relationship, and
wherein the X-phase is formed of grains having an average particle diameter "x", the Y-phase is formed of grains having an average particle diameter "y", and the Z-phase is formed of grains having an average particle diameter "z", the average particle diameters "x", "y", and "z" satisfying relationships of z/x<0.5 and z/y<0.5.

Further features of the present invention will become apparent from the following description of exemplary embodiments with reference to the attached drawings.

DESCRIPTION OF THE EMBODIMENTS

Now, embodiments of the present invention are described with reference to the drawings, but the present invention is not limited to the following specific examples.

As described above, a method of manufacturing a ceramic article according to the present invention includes the steps of:

(i) arranging powder containing ceramics as a main component on a base;
(ii) irradiating a part or an entirety of the arranged powder with an energy beam to melt and solidify the powder, to thereby obtain a modeled article;
(iii) causing the modeled article to absorb a metal component-containing liquid; and
(iv) heating the modeled article having absorbed the metal component-containing liquid.

The manufacturing method of the present invention is suitable for manufacturing a three-dimensional modeled article of a direct modeling system. In particular, when the manufacturing method of the present invention is applied to a powder bed direct modeling system, a directional energy lamination system (so-called cladding system) involving building up a modeling material, and the like, the mechanical strength, wear resistance, and machinability of the modeled article can be significantly improved while satisfactory modeling accuracy is achieved.

Figure 1A:
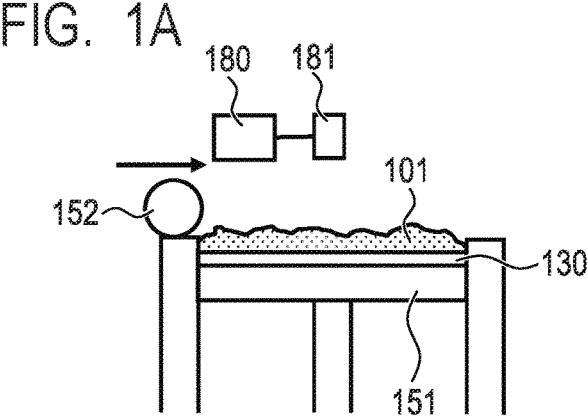
FIG. 1A is a schematic sectional view for schematically illustrating a method of manufacturing a modeled article according to one embodiment of the present invention.
Figure 1E:
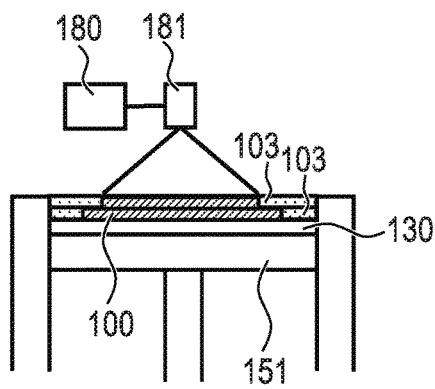
FIG. 1E is a schematic sectional view for schematically illustrating the method of manufacturing a modeled article according to the one embodiment of the present invention.
Figure 1B:
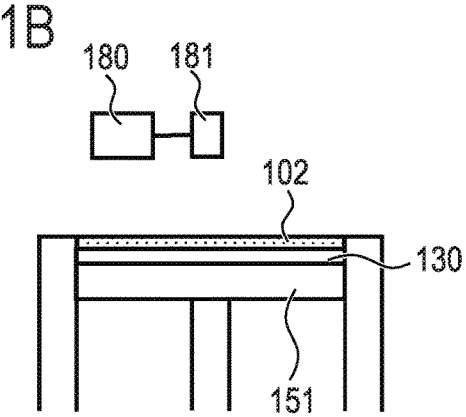
FIG. 1B is a schematic sectional view for schematically illustrating the method of manufacturing a modeled article according to the one embodiment of the present invention.
Figure 1F:
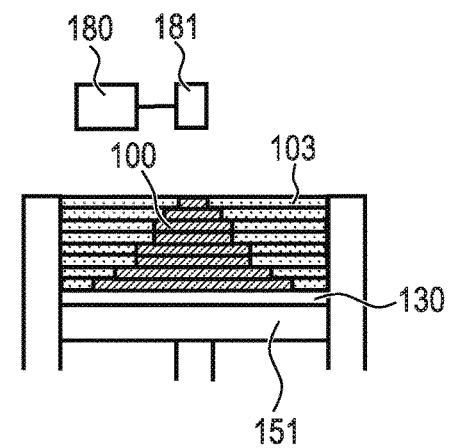
FIG. 1F is a schematic sectional view for schematically illustrating the method of manufacturing a modeled article according to the one embodiment of the present invention.
Figure 1C:
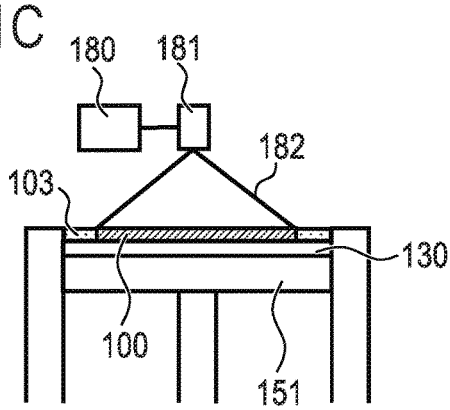
FIG. 1C is a schematic sectional view for schematically illustrating the method of manufacturing a modeled article according to the one embodiment of the present invention.
Figure 1G:
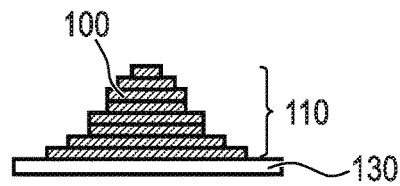
FIG. 1G is a schematic sectional view for schematically illustrating the method of manufacturing a modeled article according to the one embodiment of the present invention.
Figure 1D:
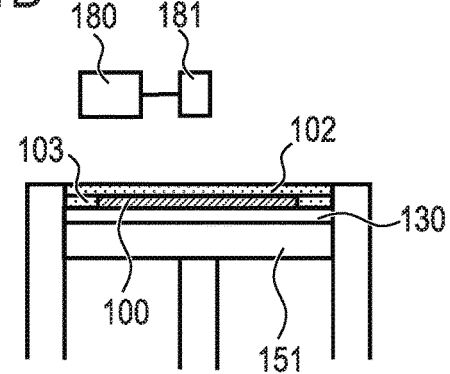
FIG. 1D is a schematic sectional view for schematically illustrating the method of manufacturing a modeled article according to the one embodiment of the present invention.
Figure 1H:
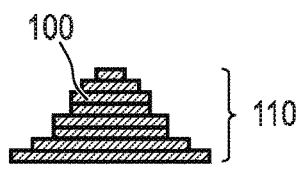
FIG. 1H is a schematic sectional view for schematically illustrating the method of manufacturing a modeled article according to the one embodiment of the present invention.

A basic flow of modeling of the powder bed direct modeling system is described with reference to FIG. 1A to FIG. 1H. First, a powder 101 is placed on a base 130 set on a stage 151, and a powder layer 102 is formed through use of a roller 152 (FIG. 1A and FIG. 1). When the surface of the powder layer 102 is irradiated with an energy beam emitted from an energy beam source 180 within an irradiation range 182 corresponding to a modeling shape while being scanned with a scanner portion 181, the powder is melted and then solidified to form a modeled article 100 (FIG. 1C). Next, the stage 151 is lowered, and the powder layer 102 is newly formed on the above-mentioned modeled article 100 (FIG. 1D). A series of those steps are repeatedly performed to form a modeled article 110 having a desired shape (FIG. 1E and FIG. 1F). Finally, an unsolidified powder 103 is removed. As required, an unnecessary portion of the intermediate modeled article is removed, and the modeled article and the base are separated from each other (FIG. 1G and FIG. 1H).

Figure 2A:
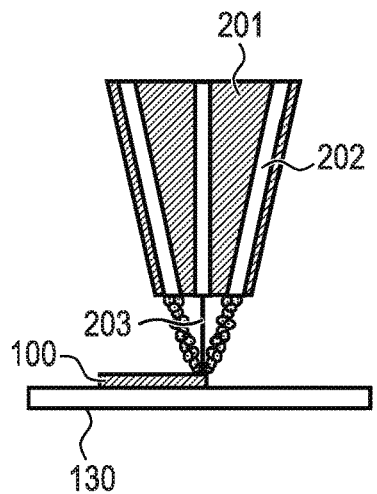
FIG. 2A is a schematic sectional view for schematically illustrating a method of manufacturing a modeled article according to one embodiment of the present invention.
Figure 2B:
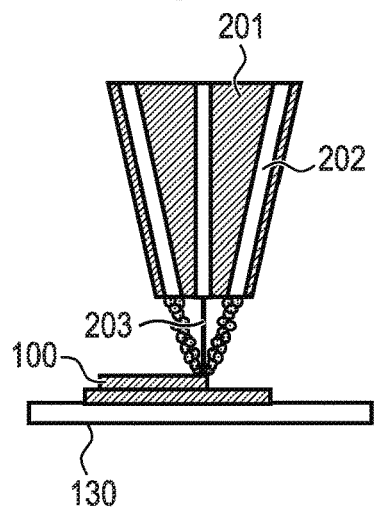
FIG. 2B is a schematic sectional view for schematically illustrating the method of manufacturing a modeled article according to the one embodiment of the present invention.
Figure 2C:
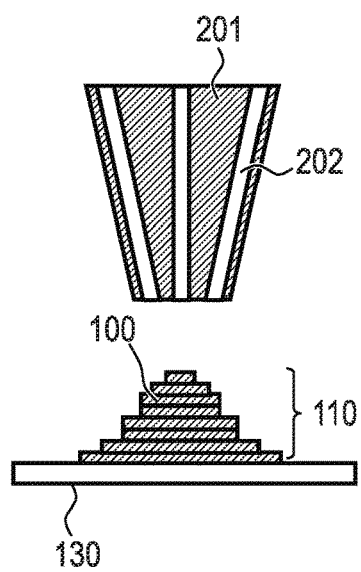
FIG. 2C is a schematic sectional view for schematically illustrating the method of manufacturing a modeled article according to the one embodiment of the present invention.

Next, the cladding system is described with reference to FIG. 2A to FIG. 2C. The cladding system is a procedure involving causing powder to be ejected from a plurality of powder supply holes 202 in a cladding nozzle 201, irradiating a region in which the powder is focused with an energy beam 203 to additionally form the modeled article 100 at a desired place (FIG. 2A), and repeating those steps to obtain the modeled article 110 having a desired shape (FIG. 2B and FIG. 2C). Finally, as required, an unnecessary portion of the modeled article is removed, and the modeled article and the base are separated from each other.

In the case of the direct modeling system, such as the powder bed direct modeling system and the cladding system, the powder melted by irradiation with an energy beam is cooled and solidified by the surroundings to form a modeled article. In the case of ceramics, the difference in temperature between melting and solidification is large, and hence a large number of microcracks are generated in a modeled article. The microcracks are distributed over the entire modeled article (surface and inside). When the cross-section of the modeled article is checked with a scanning electron microscope or the like, most of the microcracks each have a width of from several nm to several m. In addition, the lengths of the microcracks vary from several m to several mm. According to the present invention, the metal component-containing liquid is absorbed by the microcracks of the modeled article, followed by heating. With this, the vicinity of the microcracks can be selectively melted, and the microcracks in the modeled article are reduced while a change in shape of the modeled article is suppressed, with the result that the mechanical strength of the modeled article can be improved.

It is preferred that the energy beam radiated to the powder layer be controlled so as to have a gentle intensity profile on the surface of the above-mentioned powder layer. Through irradiation with the beam having a gentle intensity profile, the influence on a modeled portion, which is present in a lower layer of an irradiation portion, and which has been completely melted and solidified, can be reduced. With this, the microcracks in a modeled portion of the lower layer are stored. Therefore, the generation of the microcracks can be controlled by a drawing direction or the like, and the microcracks can be homogeneously generated over the entire intermediate modeled article. For example, it is preferred that the energy beam be radiated to the powder layer in an out-of-focus state because the intensity of the energy beam has a gentle profile on the surface of the above-mentioned powder layer.

It is preferred that the metal component-containing liquid to be absorbed by the microcracks be changed to a metal compound, particularly, a metal oxide by heat treatment performed after the metal component-containing liquid is absorbed. The change to the metal oxide is preferably caused only by the metal component-containing liquid itself to be absorbed, but is also preferably accompanied by compounding, solid solution, or diffusion with the material forming the modeled article.

It is preferred that the metal oxide formed by the heat treatment be a phase that is to have a eutectic relationship with a phase forming the modeled article. When the modeled article is formed of a plurality of phases, it is only required that the metal oxide be a phase that is to have a eutectic relationship with any one of the phases forming the modeled article. With this, in the vicinity of the microcracks which the metal component has penetrated, the metal oxide phase formed by the heat treatment and the phase contained in the modeled article have a eutectic relationship, and hence the metal component is melted at a temperature lower than the melting point of the modeled article and is diffused into the modeled article. Then, as the temperature is decreased after completion of the heating, a crystal is recrystallized in the modeled article with a composition containing the metal component. As a result, while the shape of the modeled article is maintained, only a region in the vicinity of the microcracks is softened, and the effect of reducing or eliminating the microcracks is obtained. Further, the bonding force between crystal compositions such as grain boundaries of the modeled article becomes strong, and the wear resistance of the modeled article is improved. Here, the grain boundary refers to "boundary between crystal grains". For convenience of description, the crystal grains are hereinafter sometimes simply referred to as "grains".

Figure 10:
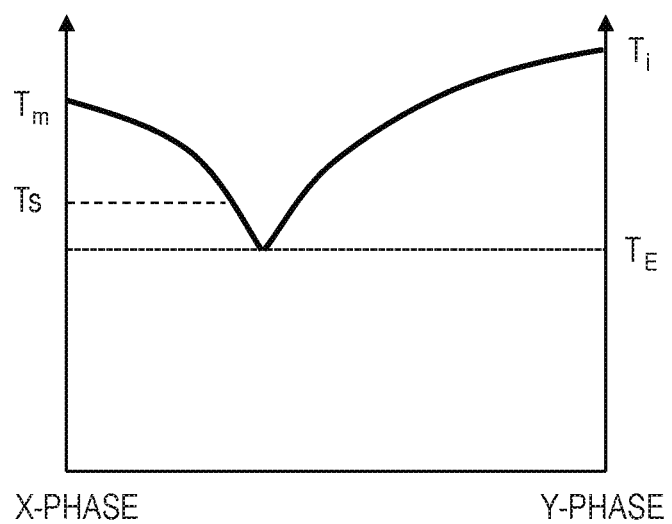
FIG. 10 is a phase diagram showing a relationship between the composition ratio and the state of an X-phase and a Y-phase that have a eutectic relationship.

In order to cause such a phenomenon, the temperature of the heat treatment performed after the metal component-containing liquid is absorbed by the microcracks of the modeled article is also important. FIG. 10 is a phase diagram showing a relationship between the composition ratio and the state of an X-phase forming the modeled article and a metal oxide Y-phase formed from the metal component-containing liquid when the X-phase and the Y-phase have a eutectic relationship. When the melting point of the X-phase is represented by $T_m$, the melting point of the Y-phase is represented by $T_i$, and the eutectic temperature of the X-phase and the Y-phase is represented by $T_E$, the respective temperatures satisfy relationships of $T_E<T_m$ and $T_E<T_i$. In this case, it is preferred that a maximum temperature $T_S$ which the modeled article reaches during the heat treatment performed after the metal component-containing liquid is absorbed be set so as to satisfy $T_E<T_S<T_m$. More preferably, $T_E<T_S<T_m-(T_m-T_E)/2$ is established. With this, the vicinity of the microcracks can be selectively melted at a temperature lower than the melting point $T_m$ of the modeled article to reduce or eliminate the microcracks, and hence the shape of the modeled article can be easily maintained.

As the number of times of repetitions of the steps of causing the modeled article to absorb the metal component-containing liquid and performing the heat treatment is increased, the effect of reducing or eliminating the microcracks is increased. However, when $T_m<T_i$ is established, the effect is increased with a small number of times. The reason for this is as described below. As shown in FIG. 10, the eutectic composition of the X-phase and the Y-phase becomes rich in X-phase due to $T_m<T_i$, and the vicinity of the microcracks can be melted at the eutectic temperature under a state of a small ratio of the Y-phase. $T_m<T_i$ is not an essential condition.

For example, when the modeled article is made of aluminum oxide ($Al_2O_3$; melting point $T_m$: 2,070° C.), a zirconium component-containing liquid is preferred as the metal component-containing liquid, and a zirconia ($ZrO_2$; melting point $T_i$: 2,715° C.) phase is formed from the zirconium component-containing liquid by the heat treatment. The eutectic temperature of $Al_2O_3$ and $ZrO_2$ is about 1,900° C. That is, $Al_2O_3$ and $ZrO_2$ are a preferred combination that satisfies the above-mentioned relationship of $T_m<T_i$.

According to such combination, the maximum temperature $T_S$ during the heat treatment can be set within a range of 1,90° ° C.<$T_S$<2,070° C. by adjusting the concentration of the $ZrO_2$ component to be absorbed by the microcracks to bring the ratio of $Al_2O_3$ and $ZrO_2$ in the vicinity of the microcracks close to the eutectic composition. Therefore, the microcracks can be reduced or eliminated by melting the vicinity of the microcracks at a temperature sufficiently lower than the melting point of $Al_2O_3$.

When the modeled article is formed of two phases of $Al_2O_3$ and $GdAlO_3$, the melting point of the modeled article is determined in accordance with the composition ratio of the two phases. For example, when the two phases have a eutectic composition, the melting point is about 1,720° C. As the metal component-containing liquid in this case, a zirconium component-containing liquid in which a $ZrO_2$ phase is generated by the heat treatment may be selected. Although the melting point of the $ZrO_2$ phase is 2,715° C., the eutectic temperature of the three phases of $Al_2O_3$, $GdAlO_3$, and $ZrO_2$ is about 1,662° C. Therefore, the microcracks can be reduced or eliminated at the maximum temperature $T_S$ during the heat treatment, which is sufficiently lower than about 1,720° C. of the modeled article.

Also when the modeled article is formed of two phases of $Al_2O_3$ and $ZrO_2$, the melting point of the modeled article is determined in accordance with the composition ratio of the two phases. For example, when the two phases have a eutectic composition, the melting point is about 1,900° C. As the metal component-containing liquid in this case, a liquid containing gadolinium and aluminum components at 1:1 may be selected. In this case, a $GdAlO_3$ phase is generated by the heat treatment, and the melting point thereof is 2,050° C. However, as described above, the eutectic temperature of the three phases of $Al_2O_3$, $GdAlO_3$, and $ZrO_2$ is about 1,662° C. Therefore, the heat treatment is performed at a temperature sufficiently lower than about 1,900° C. that is the melting temperature of the modeled article, thereby being capable of reducing or eliminating the microcracks.

As described above, there are an infinite number of other combinations of at least one phase forming the modeled article and the phase of the metal oxide obtained by the heat treatment of the metal component-containing liquid. Examples of the combination satisfying a relationship of $T_m<T_i$ include, but not limited to, $SiO_2$ and $ZrO_2$, $SiO_2$ and $Al_2O_3$, $Al_2O_3$ and $MgO$, $Al_2O_3$ and $HfO_2$, [$Al_2O_3$ and $ReAlO_3$ (Re represents a rare earth)] and $ZrO_2$, [$Al_2O_3$ and $Re_3Al_5O_{12}$ (Re represents a rare earth)] and $ZrO_2$, [$Al_2O_3$ and $ReAlO_3$ (Re represents a rare earth)] and $HfO_2$, [$Al_2O_3$ and $Re_3Al_5O_{12}$ (Re represents a rare earth)] and $HfO_2$, $Mg_2Al_4Si_5O_{18}$ and $Mg_2SiO_4$, and $Mg_2Al_4Si_5O_{18}$ and $MgSiO_3$. In the above description, a phase forming the modeled article is shown in [ ], and a metal oxide phase obtained by the heat treatment of the metal component-containing liquid is shown following [ ].

The modeled article is formed of a crystalline structure or an amorphous structure formed by irradiation with an energy beam. As described above, the metal component is diffused into the crystalline structure or the amorphous structure and is recrystallized in the heating step after the metal component-containing liquid is absorbed. For this reason, the grains forming the phase originally contained in the modeled article before heating and the grains forming the phase containing the metal component are different from each other in grain size (for example, an average particle diameter) after heating. Thus, when the modeled article has a phase separation structure formed of a plurality of phases having different average particle diameters of grains, the bonding force between crystal structures becomes strong. As a result, the mechanical strength, wear resistance, and machinability of the resultant modeled article are improved, and precise finishing with few chips can be performed.

As described above, the present invention has a feature in that a metal component is introduced into a modeled article produced by melting powder with an energy beam, followed by solidifying. Even when the metal component to be absorbed by the microcracks later is contained in advance in the powder before being melted, the same effects as those of the present invention cannot be obtained. Even when the powder before being melted contains the metal component to be absorbed by the microcracks later, an infinite number of the microcracks are formed in the modeled article due to thermal stress caused by the difference in temperature between melting and solidification. When the absorbing step of the present invention is performed, the reduction in microcracks is achieved, and the mechanical strength of the modeled article can be improved.

In addition, when the metal compound generated when the metal component-containing liquid used the step (iii) is heated is contained in an amount of 3 mol % or more in the powder before being melted, it is difficult to locally melt only the vicinity of a microcrack portion in the heating step, and there is a risk in that the modeled article may be deformed. Thus, the amount of the above-mentioned metal compound contained in advance in the powder before being melted is preferably less than 3 mol %, more preferably less than 2 mol %. In addition, in order to obtain a modeled article that can be precisely machined with few chips, the amount of the above-mentioned metal compound contained in advance in the powder before being melted is preferably less than 1 mol %. When the amount is less than 1 mol %, a modeled article formed of a plurality of phases having significantly different average particle diameters of grains is obtained, and hence the effect of improving the machinability of the modeled article can be reliably obtained.

Next, a method of manufacturing a ceramic article according to the present invention is described. The manufacturing method of the present invention has a feature of having the following four steps:

(i) arranging powder containing ceramics as a main component on a base;

(ii) irradiating a part or an entirety of the arranged powder with an energy beam to melt and solidify the powder, to thereby obtain a modeled article;

(iii) causing the modeled article to absorb a metal component-containing liquid; and (iv) heating the modeled article having absorbed the metal component-containing liquid.

Now, each step is specifically described by taking as an example a case in which modeling is performed through use of powder containing as a main component aluminum oxide that is general-purpose structural ceramics. Through appropriate melting and solidification of aluminum oxide, a modeled article having high mechanical strength can be obtained.

Step (i)

First, powder (hereinafter sometimes referred to as "raw material powder") containing aluminum oxide as a main component is arranged on a base.

In the present invention, among objects (powder and a modeled article) to be discussed as components, a component that is contained in the largest amount when expressed in a molar ratio is called a main component, and "powder containing aluminum oxide as a main component" refers to powder containing aluminum oxide in the largest amount in a molar ratio.

In the present invention, it is preferred that the powder containing aluminum oxide as a main component contain, as a sub-component, an oxide of a rare earth element, which generates a eutectic composition with aluminum oxide. It is particularly preferred that the powder contain at least one kind selected from gadolinium oxide, terbium oxide, and praseodymium oxide. For example, when the raw material powder contains gadolinium oxide that generates a eutectic composition with aluminum oxide, the vicinity of the $Al_2O_3$—$Gd_2O_3$ eutectic composition has a melting point lower than that of aluminum oxide alone. As a result, the powder can be melted with small heat quantity, and the diffusion of energy in the powder is suppressed. Therefore, the modeling accuracy is improved. In addition, when the raw material powder contains gadolinium oxide, the modeled article has a phase separation structure formed of two or more phases. With this, the extension of cracks is suppressed, and the mechanical strength of the modeled article is improved. Even when the raw material powder contains an oxide of another rare earth element (excluding terbium and praseodymium), such as yttrium oxide, instead of gadolinium oxide, the same effect as that in the case of gadolinium oxide can be obtained.

When the energy beam is a laser beam, due to the sufficient energy absorption of the powder, the spread of heat in the powder is suppressed, and the heat is localized, to thereby reduce the influence of heat on a non-modeled portion. Therefore, the modeling accuracy is improved. For example, when a Nd:YAG laser or a fiber laser is used, it is more preferred that terbium oxide ($Tb_4O_7$), praseodymium oxide ($Pr_6O_{11}$), or the like be contained in the powder as a sub-component because terbium oxide ($Tb_4O_7$), praseodymium oxide ($Pr_6O_{11}$), or the like exhibits satisfactory energy absorption. It is also preferred that the raw material powder contain both the rare earth element exhibiting satisfactory energy absorption with respect to a laser beam, such as terbium oxide ($Tb_4O_7$) or praseodymium oxide ($Pr_6O_{11}$), and another rare earth element.

From the above-mentioned viewpoints, the raw material powder is particularly preferably, for example, $Al_2O_3$—$Gd_2O_3$, $Al_2O_3$—$Tb_4O_7$, $Al_2O_3$—$Gd_2O_3$—$Tb_4O_7$, $Al_2O_3$—$Pr_6O_{11}$, or $Al_2O_3$—$Gd_2O_3$—$Pr_6O_{11}$.

It is preferred that the raw material powder contain a composition that is to form a eutectic in a ratio of forming a eutectic composition. The eutectic composition is a composition at a eutectic point shown in a eutectic state diagram. Heating and cooling states are repeated at an extremely high speed in a modeling process using an energy beam, and hence even with a composition deviated from the eutectic point, a eutectic structure having a phase separation structure is formed. Therefore, the eutectic composition in the present invention is preferably defined as a composition range in which a eutectic structure is formed, and includes a range of 10 mol % with respect to the eutectic composition in the eutectic phase diagram. Also in the case of powder containing a main component other than aluminum oxide, it is similarly preferred that the powder contain a composition that is to form a eutectic in a ratio of forming a eutectic composition.

As used herein, materials may be expressed through use of chemical formulae, such as $Al_2O_3$ and $Tb_4O_7$ described above. However, as long as the spirit of the present invention is satisfied, it is not required that the constituent ratio of elements of an actual material be strictly matched with the chemical formula ratio. That is, the valence of a metal element forming a certain material may be slightly different from the valence assumed from the chemical formula. For example, the valence of Tb assumed from $Tb_4O_7$ is 4, but terbium oxide in which the valence of Tb is within a range of 3.5 or more and less than 4.5 is included in $Tb_4O_7$.

A material for the base to be used in the present invention may be appropriately selected and used from materials, such as ceramics, metal, and glass, that are generally used in manufacturing of three-dimensional modeled articles in consideration of the application, manufacturing conditions, and the like of the modeled article. In the step (iv), when an intermediate modeled article integrated with the base is heated, it is preferred to use ceramics having heat resistance for the base.

The method of arranging the powder on the base is not particularly limited. In the case of the powder bed direct modeling system, as illustrated in FIG. 1A to FIG. 1H, the powder is arranged in layers on the base with a roller, a blade, or the like. In the case of the cladding system, as illustrated in FIG. 2A to FIG. 2C, the powder is sprayed and supplied from the nozzle to an irradiation position of an energy beam so that the powder is arranged in the form of being built up on the base or the intermediate modeled article arranged on the base. Simultaneously with this, the powder is melted by irradiation with an energy beam and solidified to produce the intermediate modeled article.

Step (ii)

In the subsequent step (ii), a part or an entirety of the powder arranged on the base in the above-mentioned step (i) is irradiated with an energy beam based on three-dimensional shape data of an article to be manufactured, and the above-mentioned powder positioned in an irradiation region is melted and solidified to obtain an intermediate modeled article. Now, this step is described by way of a preferred embodiment.

In the case of the powder bed direct modeling system, as illustrated in FIG. 1A to FIG. 1H, the powder is melted by irradiating a predetermined region on the surface of the powder arranged on the base in the step (i) with the energy beam while scanning the surface with the energy beam, and then is solidified. In the case of the cladding system, as illustrated in FIG. 2A to FIG. 2C, the powder is selectively arranged in a region in which the powder is sprayed and supplied to be modeled in the form of being built up on the base in the step (i). Simultaneously with this, the arranged powder is irradiated with the energy beam to be melted and solidified. When the powder is irradiated with the energy beam, the powder absorbs energy, and the energy is converted into heat to melt the powder. When the irradiation is completed through passage of the energy beam, the melted powder is cooled and solidified by the atmosphere and an adjacent peripheral portion thereof, and thus a modeled article is formed. In this case, due to the rapid cooling in the melting and solidification process, stress is generated in the surface layer and inside of the modeled article, and an infinite number of microcracks are formed.

As the energy beam to be used, a light source having an appropriate wavelength is selected in consideration of the absorption characteristics of the powder. In order to perform modeling with high accuracy, it is preferred to adopt a laser beam or an electron beam which can be reduced in beam diameter and has high directivity. As the energy beam suitable for the powder containing aluminum oxide as a main component, there are given laser beams, such as a YAG laser and a fiber laser each having a 1 µm wavelength band, and a $CO_2$ laser having a 10 µm wavelength band. When the powder contains terbium oxide or praseodymium oxide as a sub-component, the YAG laser and the fiber laser each having a 1 µm wavelength band in which terbium oxide and praseodymium oxide exhibit high absorption are particularly preferred.

A series of the steps (i) and (ii) may be repeatedly performed. That is, the powder is newly arranged through the step (i) on the modeled article obtained in the step (ii). When the arranged powder is irradiated with the energy beam based on slice data generated from the three-dimensional shape data of the article to be manufactured, the powder in the energy beam irradiation portion is melted and solidified to form a new modeled article integrated with the modeled article formed in advance. Through alternate repetition of the step (i) and the step (ii), a modeled article having a desired three-dimensional shape corresponding to the three-dimensional shape data is obtained.

Step (iii)

Next, there is the step of impregnating the modeled article obtained in the step (ii) with a metal component-containing liquid. The metal component-containing liquid has a feature that a metal component therein is oxidized to metal oxide by heating and the metal oxide and a component that mainly forms the modeled article have a eutectic relationship.

Hereinafter, the metal component-containing liquid is described below by taking a zirconium component-containing liquid as an example for the metal component-containing liquid suitable for the modeled article containing $Al_2O_3$—$GdO_3$ as a main component. The zirconium component-containing liquid is described. The zirconium component-containing liquid is formed of a raw material for a zirconium component, an organic solvent, and a stabilizer.

As the raw material for the zirconium component, various zirconium compounds may be used. As the raw material for the zirconium component, metal alkoxides, chlorides, and salt compounds, such as nitrates, of zirconium may be used. Of those, the metal alkoxide is preferred because, when the metal alkoxide is used, the microcracks of the modeled article can be uniformly impregnated with the zirconium component-containing liquid. Specific examples of the zirconium alkoxide include zirconium tetraethoxide, zirconium tetra-n-propoxide, zirconium tetraisopropoxide, zirconium tetra-n-butoxide, and zirconium tetra-t-butoxide.

First, a zirconium alkoxide is dissolved in an organic solvent to prepare a solution of the zirconium alkoxide. The addition amount of the organic solvent added to the zirconium alkoxide is preferably 5 or more and 30 or less in terms of a molar ratio with respect to the compound. The addition amount is more preferably 10 or more and 25 or less. In addition, in the present invention, the addition amount of M being 5 in terms of a molar ratio with respect to N means that the molar quantity of M to be added is 5 times as large as that of N. When the concentration of the zirconium alkoxide in the solution is extremely low, the modeled article cannot be impregnated with a sufficient amount of a zirconium component. Meanwhile, when the concentration of the zirconium alkoxide in the solution is extremely high, the zirconium component in the solution is aggregated, and the zirconium component cannot be uniformly arranged in the microcrack portion of the modeled article.

As the organic solvent, alcohols, carboxylic acids, aliphatic or alicyclic hydrocarbons, aromatic hydrocarbons, esters, ketones, ethers, or mixed solvents of two or more kinds thereof are used. Preferred examples of the alcohols include methanol, ethanol, 2-propanol, butanol, 2-methoxyethanol, 2-ethoxyethanol, 1-methoxy-2-propanol, 1-ethoxy-2-propanol, 1-propoxy-2-propanol, 4-methyl-2-pentanol, 2-ethylbutanol, 3-methoxy-3-methylbutanol, ethylene glycol, diethylene glycol, and glycerin. Preferred examples of the aliphatic or alicyclic hydrocarbons include n-hexane, n-octane, cyclohexane, cyclopentane, and cyclooctane. Preferred examples of the aromatic hydrocarbons include toluene, xylene, and ethylbenzene. Preferred examples of the esters include ethyl formate, ethyl acetate, n-butyl acetate, ethylene glycol monomethyl ether acetate, ethylene glycol monoethyl ether acetate, and ethylene glycol monobutyl ether acetate. Preferred examples of the ketones include acetone, methyl ethyl ketone, methyl isobutyl ketone, and cyclohexanone. Examples of the ethers include dimethoxyethane, tetrahydrofuran, dioxane, and diisopropyl ether. In preparing a coating solution to be used in the present invention, it is preferred that, of the various solvents described above, the alcohols be used from the viewpoint of the stability of the solution.

Next, the stabilizer is described. The zirconium alkoxide is highly reactive with water, and hence is abruptly hydrolyzed by moisture in air and addition of water, resulting in cloudiness and precipitation of the solution. In order to prevent the cloudiness and precipitation of the solution, it is preferred to add the stabilizer to stabilize the solution. Examples of the stabilizer may include: β-diketone compounds, such as acetylacetone, 3-methyl-2,4-pentanedione, 3-ethyl-2,4-pentanedione, and trifluoroacetylacetone; β-ketoester compounds, such as methyl acetoacetate, ethyl acetoacetate, butyl acetoacetate, allyl acetoacetate, benzyl acetoacetate, isopropyl acetoacetate, tert-butyl acetoacetate, isobutyl acetoacetate, ethyl 3-oxohexanoate, ethyl 2-methylacetoacetate, ethyl 2-fluoroacetoacetate, and 2-methoxyethyl acetoacetate; and alkanolamines, such as monoethanolamine, diethanolamine, and triethanolamine. The addition amount of the stabilizer is preferably 0.1 or more and 3 or less in terms of a molar ratio with respect to zirconium alkoxide. The addition amount is more preferably 0.5 or more and 2 or less.

The solution may be prepared through a reaction at room temperature or refluxing.

The powder melted by irradiation with an energy beam while being scanned with the energy beam in the step (ii) is cooled and solidified by the surroundings to form a modeled article. In the case of ceramics, the difference in temperature between melting and solidification is large, and hence a large number of microcracks are generated in the modeled article due to the difference between the expansion ratio and the shrinkage ratio. Thus, the microcracks are present vertically and horizontally in the modeled article.

The zirconium component-containing liquid penetrates not only the surface layer of the modeled article but also the inside of the modeled article through the microcracks and is distributed through the step (iii). As long as a sufficient amount of the zirconium component can be interposed within a sufficient range of the microcracks of the modeled article, the procedure for causing the modeled article to absorb the zirconium component-containing liquid is not particularly limited. The modeled article may be immersed in and impregnated with the zirconium component-containing liquid, or the zirconium component-containing liquid may be sprayed onto the modeled article in the form of a mist or applied to the surface with a brush or the like to be absorbed therein. In addition, a plurality of those procedures may be combined with each other, or the same procedure may be repeated a plurality of times. In the case of spraying or applying the zirconium component-containing liquid, it is preferred to spray or apply the zirconium component-containing liquid in an amount of 5 vol % or more and 20 vol % or less of the modeled article that has not absorbed the zirconium component-containing liquid. When the amount is less than 5 vol %, the amount of the zirconium component to be arranged in the microcrack portion of the modeled article is insufficient, and there is a risk in that the microcrack portion may not be melted. In the case where the amount is more than 20 vol %, when the step (i) is performed after the step (iii), there is a risk in that it may be difficult to uniformly arrange the powder on the modeled article due to the influence of the zirconium component-containing liquid. In the case of such a modeled article having a large volume as obtained by repeating the steps (i) and (ii) a large number of times, it is preferred to immerse the modeled article in the zirconium component-containing liquid, and degas the modeled article under reduced pressure, in order to cause the zirconium component to sufficiently spread to the inside of the modeled article. Alternatively, after the modeled article is put in a sealed container and degassed under reduced pressure, the modeled article may be immersed in the zirconium component-containing liquid. Alternatively, it is preferred that the zirconium component-containing liquid be sprayed onto the modeled article in the form of a mist in the middle of repeating the steps (i) and (ii) to be absorbed in the modeled article in each stage. That is, the order of steps such as "step (i)→step (ii)→step (iii)→step (i)→ . . . " is preferred.

Step (iv)

In the next step (iv), the modeled article impregnated with the metal component-containing liquid is subjected to heat treatment.

In the step (iii), the metal component is distributed in the surface layer of the modeled article and the microcracks in the modeled article after the modeled article is impregnated with the metal component-containing liquid. In the vicinity of the microcracks of the modeled article that has undergone the step (iii), much amount of metal component is present with respect to other part of the modeled article, and the metal component is oxidized to metal oxide by heating. Accordingly, as compared to a portion of the modeled article that is away from the microcracks, the vicinity of the microcracks approaches the eutectic composition due to the metal oxide and the component that mainly forms the modeled article, and hence has a low melting point. Through use of the difference in melting point, the modeled article that has undergone the step (iii) is heated at a temperature which is equal to or higher than the eutectic point of the eutectic phase formed by the metal oxide and the component that mainly forms the modeled article, and which is equal to or lower than the melting point of the material forming the modeled article. With this, while the shape of the modeled article is maintained, the portion of the modeled article in which the metal oxide is present, that is, the vicinity of the microcracks of the modeled article is sintered due to the low melting point of the eutectic composition, or the microcracks are partially melted to reduce or eliminate the microcracks.

When the modeled article is formed of a two-phase material, and the two phases and an oxide of the metal component form a three-phase eutectic, the three-phase eutectic point is lower than the two-phase eutectic point. In this case, the step (iv) can be performed at a temperature further lower than that in a case in which the modeled article is formed of one phase, and the temperature unevenness of heating in the modeled article can be reduced even when the modeled article has a relatively large size. Therefore, the above-mentioned relationship is more preferred. In addition, when an article to be manufactured is an oxide, the step (iv) can be easily performed in an electric furnace or the like in the atmospheric atmosphere as long as the temperature is relatively low.

$Al_2O_3$—$Gd_2O_3$ is a material that can form a three-phase eutectic with zirconium oxide which is the oxide of the metal component. Therefore, when the step (iii) is performed on a modeled article formed of powder containing $Al_2O_3$—$Gd_2O_3$ as a main component to set the vicinity of the microcracks to a composition ratio with which a three-phase eutectic can be formed, the melting point can be locally reduced significantly. Then, through use of the difference in melting point, only the vicinity of the microcracks can be melted by heating at a temperature which is equal to or higher than the three-phase eutectic point, and which is equal to or lower than the melting point of the modeled article. Specifically, the microcracks can be reduced or eliminated by performing the heat treatment so that the maximum temperature in the vicinity of the microcracks of the modeled article, which is formed of powder containing $Al_2O_3$—$Gd_2O_3$ as a main component, and which has undergone the step (iii), is 1,662° C. or more and 1,710° C. or less.

The heating time is not limited as long as the vicinity of the microcracks reaches the maximum temperature. Specifically, it is appropriate that the modeled article be heated at a temperature which the vicinity of the microcracks is to reach in step (iii). Under a state in which the microcrack portion and the vicinity thereof are melted, the diffusion of atoms proceeds in a direction in which the surface energy is decreased, and the microcracks are reduced or eliminated. That is, by heating, the zirconium component distributed in the microcrack portion is diffused into the crystalline and amorphous inner portions of the modeled article, and the crystal is recrystallized under a state of containing the zirconium component. For this reason, the grains forming a phase of aluminum oxide and a phase containing a rare earth element added as a sub-component, which are formed in the modeled article in the step (i), and the grains forming a phase containing the zirconium component are significantly different from each other in grain size (for example, an average particle diameter). In addition to the reduction or elimination of the microcracks, the phase separation structure formed of a plurality of phases having different average particle diameters of constituent grains is formed, with the result that the machineability of the modeled article is improved, and precise finishing with few chips can be performed.

In order to selectively melt only the vicinity of the portion in which the zirconium component is present, it is appropriate that the heating temperature and the concentration of the zirconium component in the vicinity of the microcracks be adjusted. Through such adjustment, the shape of the modeled article is not lost, and the complicated shape and precise shape formed by the direct modeling system are maintained. Thus, the shape of the modeled article substantially as designed is obtained, and modeling with high modeling accuracy can be achieved.

When a sufficient zirconium component is present in the microcrack portion, there is the effect that the vicinity of the microcracks is melted to reduce or eliminate the microcracks as described above. The zirconium component concentration in the microcrack portion may be adjusted by the concentration of the zirconium component in the zirconium component-containing liquid, the method of causing the microcracks to absorb the zirconium component-containing liquid, the number of times thereof, and the like. In particular, when the vicinity of the microcracks approaches a eutectic composition in which zirconium oxide is in the vicinity of 38 mol % with respect to 62 mol % of the modeled article containing aluminum oxide as a main component, the vicinity of the microcracks is more easily melted. In order to selectively melt the vicinity of the microcracks to reduce or eliminate the microcracks, it is more preferred to perform heating at a temperature of 1,900° C. or more and melting point of alumina at 2,070° C. or less.

A modeled article formed of powder containing $Al_2O_3$—$Gd_2O_3$ as a main component includes a phase containing $Al_2O_3$ as a main component and a phase containing $GdAlO_3$ as a main component. When the modeled article is caused to absorb the zirconium component-containing liquid (step (iii)), and is heated at a temperature of 1,662° C. or more and 1,710° C. or less (step (iv)), the zirconium component distributed in the microcrack portion is diffused into the crystal of the intermediate modeled article to be recrystallized, to thereby form a three-phase eutectic including a phase containing $ZrO_2$ having a fluorite structure as a main component, a phase containing $Al_2O_3$ as a main component, and a phase containing $GdAlO_3$ as a main component. The average particle diameters of grains forming the phase containing, as a main component, $Al_2O_3$ that has been originally present in the modeled article immediately after being formed in the step (i), that is, the modeled article before undergoing the step (iv), and the phase containing $GdAlO_3$ as a main component significantly vary depending on the heat treatment in the step (iv). Meanwhile, the average particle diameter of grains forming the phase containing $ZrO_2$ having a fluorite structure as a main component formed by the diffusion and recrystallization of the zirconium component distributed in the microcrack portion is smaller than those of the other two phases. In this manner, when the phase containing $ZrO_2$ as a main component having a small average particle diameter is formed in the modeled article, the bonding force between the crystal structures of the modeled article is increased, and the wear resistance of the modeled article is significantly improved. In addition, a modeled article having high machinability, which is capable of being subjected to precise finishing with few chips of grains, is obtained.

In order to improve the wear resistance and the machinability, it is required to sufficiently diffuse the zirconium component into the crystal of the modeled article. From this viewpoint, it is preferred to heat the modeled article for a long period of time. From the viewpoint of widely diffusing the zirconium component into the crystal, it is preferred to heat the modeled article at a relatively high temperature for a long period of time within a range in which the modeled article is not deformed. It is preferable that the heating temperature is a temperature between a melting point of the component that mainly forms the modeled article and an eutectic point of the eutectic composition due to the metal oxide formed from the metal component-containing liquid, for example zirconium oxide, and the component that mainly forms the modeled article.

The above-mentioned heating method is not particularly limited. The intermediate modeled article that has absorbed the zirconium component-containing liquid may be heated again by irradiation with an energy beam, or may be heated in an electric furnace. When the intermediate modeled article is heated with an energy beam, it is required to grasp in advance the relationship between the input heat quantity of the energy beam and the temperature of the modeled article through use of a thermocouple or the like so that the modeled article is heated to the above-mentioned preferred temperature.

In the foregoing, description is given by taking, as examples, the zirconium-containing solution is absorbed into the a modeled article formed of powder containing aluminum oxide as a main component or a modeled article formed of powder containing $Al_2O_3$—$Gd_2O_3$ as a main component, but the present invention is not limited to these examples. When a liquid containing a metal component forming a eutectic with a main component of a powder forming the modeled article is absorbed in the modeled article, and then resulted article is heated at a temperature equal or more than an eutectic point of the eutectic phase and equal or lower than a melting point of the material forming the modeled article, cracks are reduced as well as described above. For example, in the case of the modeled article containing $SiO_2$ as a main component, aluminum component-containing liquid in which molar ratio of each component is adjusted to aluminum sec-butoxide:IPA:EAcAc=1.04:5:2 is absorbed into the modeled article, and then heated at 1610° C. Alternatively, zirconium component-containing liquid in which molar ratio of each component is adjusted to $Zr(O\text{-}n\text{-}Bu)_4$:IPA:EAcAc=1:15:2 is absorbed into the modeled article, and then heated at 1670° C.

In the heating step, the modeled article may stick to a setter due to melting of the surface layer of the modeled article and the vicinity of the microcracks. Therefore, when the modeled article is arranged on the setter in the heating step, it is preferred that the setter be inactive. As the inactive setter, for example, platinum or the like may be applied in the atmospheric atmosphere, and iridium or the like may be applied in a low oxygen atmosphere.

Flowchart

Now, the order of the respective steps and repetition pattern examples are described with reference to a flowchart of FIG. 3.

Figure 3:
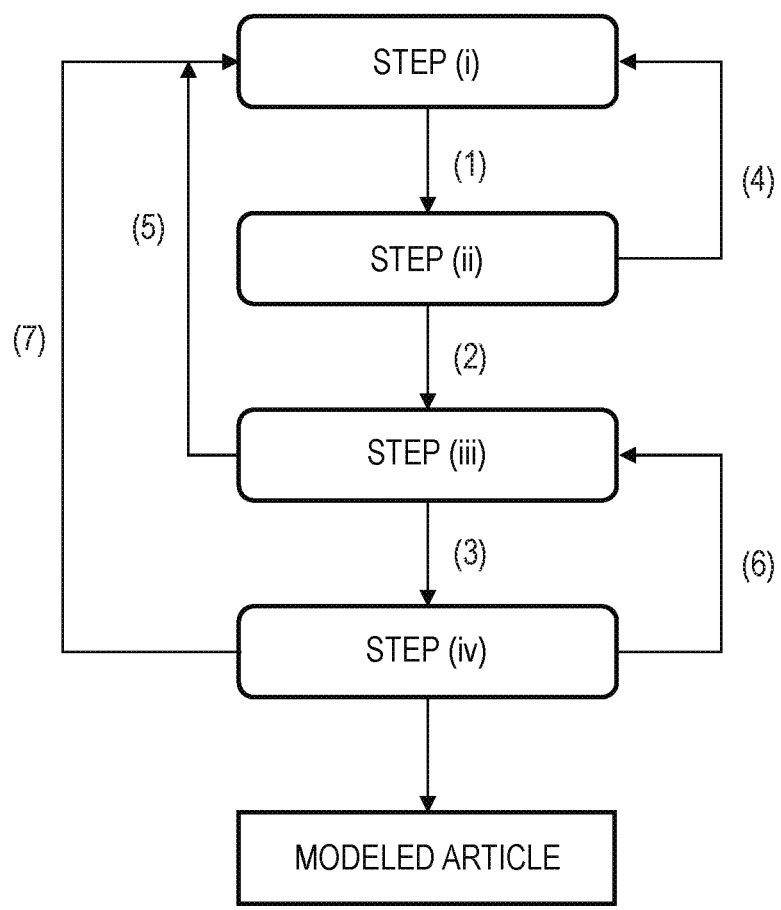
FIG. 3 is a schematic view for illustrating a flow of steps in the method of manufacturing a modeled article of the present invention.

A basic flow is a flow that proceeds in the order of flow lines (1), (2), and (3) of FIG. 3. That is, the basic flow is a flow in which each step is performed in the order of step (i)→step (ii)→step (iii)→step (iv). The effects of the present invention can be obtained by performing all the steps from the step (i) to the step (iv) each at least once.

As illustrated in flow lines (4), (5), (6), and (7) of FIG. 3, each step may be repeatedly performed.

The flow lines (1) and (4) are flow lines for repeatedly performing the step (i) and the step (ii). Repeating the step (i) and the step (ii) "n" times ("n" represents a natural number) in the stated order is expressed as [step (i)→step (ii)]$^n$. The symbol "n" in [Step (i)→Step (ii)]$^n$ corresponds to the number of slices "n" of slice data generated from three-dimensional shape data of a three-dimensional object to be manufactured, which is characteristically used in a method of manufacturing a three-dimensional modeled article using a direct modeling system. With this, a modeled article having a desired shape based on the three-dimensional shape data can be obtained. For example, the modeled article 110 as illustrated in FIG. 1G is obtained by repeatedly performing the step (i) and the step (ii). In FIG. 1A to FIG. 1H, first, the powder 101 is placed on the base 130, and the powder layer 102 is formed through use of the roller 152 (FIG. 1A and FIG. 1). This operation corresponds to the step (i). Next, when the surface of the powder layer 102 is irradiated with the energy beam emitted from the energy beam source 180 while the irradiation range 182 based on the slice data is scanned with the scanner portion 181, the powder is melted and then solidified to form the modeled article 100 for one layer (FIG. 1C). This operation corresponds to the step (ii). The stage 151 is lowered, and the powder layer 102 is newly formed on the above-mentioned modeled article 100 (FIG. 1D), and is irradiated with the energy beam (FIG. 1E). A series of those steps are repeatedly performed to form the modeled article 110 having a desired shape based on the three-dimensional shape data (FIG. 1F). This operation corresponds to [step (i)→step (ii)]$^n$.

The flow lines (3) and (6) are flow lines for repeatedly performing the step (iii) and the step (iv). Repeating the step (iii) and the step (iv) "m" times ("m" represents a natural number) in the stated order is expressed as [step (iii)→step (iv)]$^m$. After the intermediate modeled article having a desired shape is obtained through [Step (i)→Step (ii)]$^n$, [Step (iii)→Step (iv)]$^m$ can be performed. The number of times of repetitions "m" of the step (iii) and the step (iv) may be determined so that the vicinity of the microcracks of the modeled article approaches a eutectic composition in which zirconium oxide is in the vicinity of 22 mol % with respect to 78 mol % of the intermediate modeled article containing aluminum oxide as a main component. With this, the vicinity of the microcracks is more easily melted, and the effect of reducing or eliminating the microcracks is improved. As a result, the three-point bending strength of the modeled article is further increased, and a larger amount of the zirconium component is diffused and recrystallized in the crystal of the modeled article, and hence the wear resistance and machinability of the surface of the modeled article are further improved.

When the step (iii) and the step (iv) are repeatedly performed, the zirconium component is diffused into the modeled article every time the step (iii) and the step (iv) are repeated. Then, the concentration difference of the zirconium component becomes small between the vicinity of the microcrack portion of the modeled article and a portion other than the vicinity of the microcrack portion. With this, the difference between the melting point (eutectic point) in the vicinity of the microcrack portion of the modeled article and the melting point of the portion other than the vicinity of the microcrack portion is reduced. From the viewpoint of melting only the vicinity of the microcrack portion, the above-mentioned difference in melting point is preferably 20° C. or more, more preferably 30° C. or more. It is preferred that, in the modeled article formed of powder containing aluminum oxide as a main component, the content of the zirconium component in the modeled article be less than 3 mol % because only the vicinity of the microcracks can be melted while a change in shape of the modeled article is suppressed. It is more preferred that the content of the zirconium component in the modeled article be less than 2 mol %.

Further, in order to obtain a modeled article capable of being precisely machined with few chips, it is preferred that the content of the zirconium component in the raw material powder be less than 1 mol %. When the zirconium component is less than 1 mol %, the modeled article that has undergone the step (iv) is formed under a state of including phases having significantly different average particle diameters of grains, and hence the effect of improving the machinability of the modeled article as described above can be reliably obtained. When the raw material powder contains a zirconium component (for example, zirconium oxide) in a content of 3 mol % or more, it is difficult to locally melt only the vicinity of the microcrack portion in the heating step, and there is a risk in that the modeled article may be deformed.

Figure 4A:
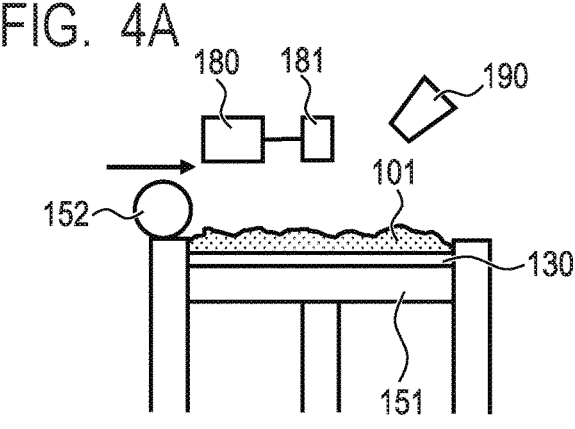
FIG. 4A is a schematic sectional view for schematically illustrating a method of manufacturing a modeled article according to one embodiment of the present invention.
Figure 4E:
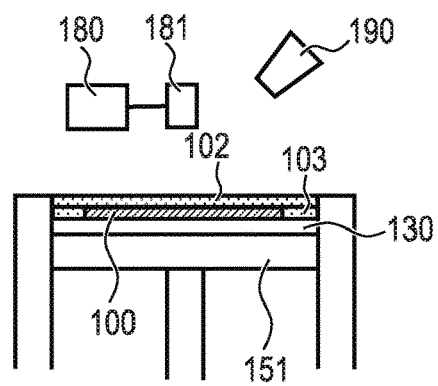
FIG. 4E is a schematic sectional view for schematically illustrating the method of manufacturing a modeled article according to the one embodiment of the present invention.
Figure 4B:
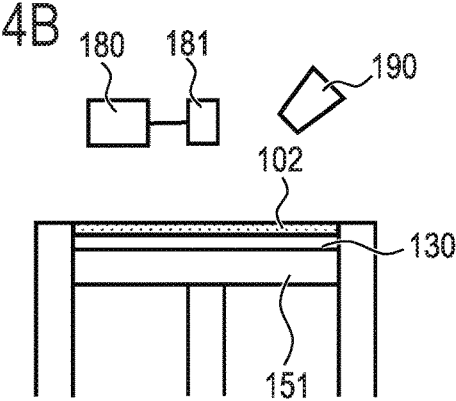
FIG. 4B is a schematic sectional view for schematically illustrating the method of manufacturing a modeled article according to the one embodiment of the present invention.
Figure 4F:
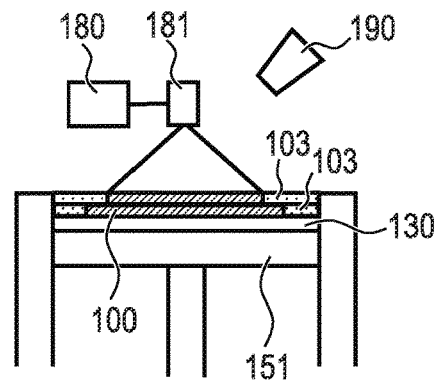
FIG. 4F is a schematic sectional view for schematically illustrating the method of manufacturing a modeled article according to the one embodiment of the present invention.
Figure 4C:
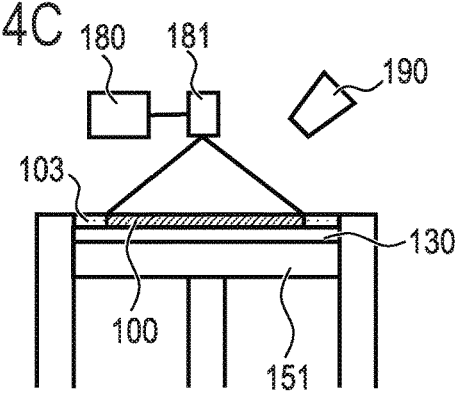
FIG. 4C is a schematic sectional view for schematically illustrating the method of manufacturing a modeled article according to the one embodiment of the present invention.
Figure 4G:
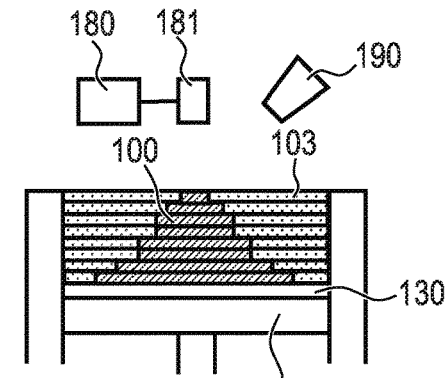
FIG. 4G is a schematic sectional view for schematically illustrating the method of manufacturing a modeled article according to the one embodiment of the present invention.
Figure 4D:
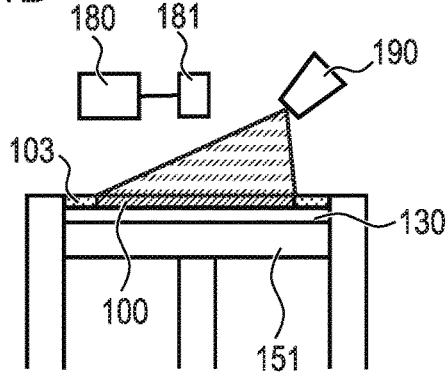
FIG. 4D is a schematic sectional view for schematically illustrating the method of manufacturing a modeled article according to the one embodiment of the present invention.
Figure 4H:
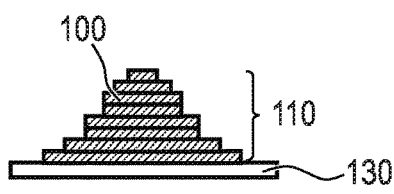
FIG. 4H is a schematic sectional view for schematically illustrating the method of manufacturing a modeled article according to the one embodiment of the present invention.

The flow lines (1), (2), and (5) are flow lines for performing the step (i) and the step (ii) again after the step (iii). The step (iii) is performed on the intermediate modeled article in the middle of forming the modeled article 110 having a desired shape. Repeating the step (i), the step (ii), and the step (iii) "p" times ("p" represents a natural number) in the stated order is expressed as [step (i)→step (ii)→step (iii)]$^p$. An example in which the flow lines (1), (2) and (5) are applied to the powder bed direct modeling system is illustrated in FIG. 4A to FIG. 4H. First, the powder 101 is placed on the base 130, and the powder layer 102 is formed through use of the roller 152 (FIG. 4A and FIG. 4B). This operation corresponds to the step (i). Next, when the surface of the powder layer 102 is irradiated with the energy beam emitted from the energy beam source 180 while being scanned with the scanner portion 181, the powder is melted and then solidified to form the modeled article 100 (FIG. 4C). This operation corresponds to the step (ii). Next, a zirconium component-containing liquid is sprayed from a liquid jet nozzle 190 onto the modeled article 100 (FIG. 4D). This operation corresponds to the step (iii). Subsequently, the stage 151 is lowered, and the powder layer 102 is newly formed on the above-mentioned modeled article 100 (FIG. 4E). This operation corresponds to the step (i). A series of those steps are repeatedly performed to form the modeled article 110 having a desired shape impregnated with the zirconium component-containing liquid (FIG. 4G and FIG. 4H). As described above, when the step (iii) is performed on the modeled article in the middle of modeling through the flow lines (1), (2), and (5), the zirconium component-containing liquid can be caused to sufficiently spread to the inside of the modeled article, in particular, when the size of the final modeled article is large. Therefore, the effect of reducing or eliminating the microcracks is enhanced.

Figure 5A:
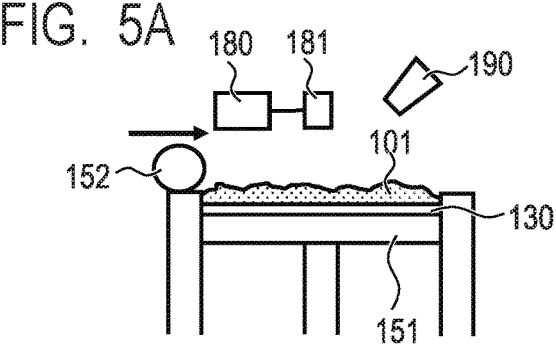
FIG. 5A is a schematic sectional view for schematically illustrating a method of manufacturing a modeled article according to one embodiment of the present invention.
Figure 5B:
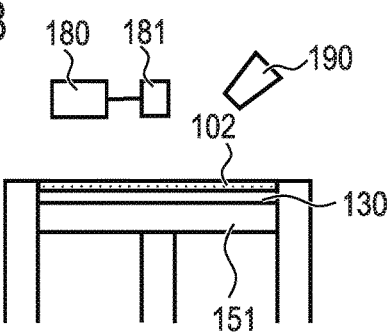
FIG. 5B is a schematic sectional view for schematically illustrating the method of manufacturing a modeled article according to the one embodiment of the present invention.
Figure 5C:
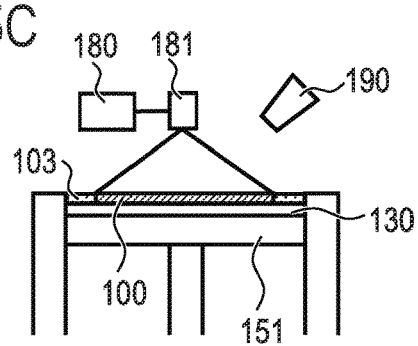
FIG. 5C is a schematic sectional view for schematically illustrating the method of manufacturing a modeled article according to the one embodiment of the present invention.
Figure 5D:
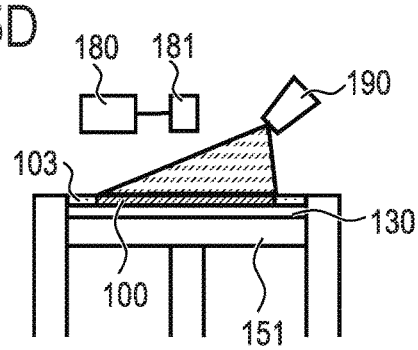
FIG. 5D is a schematic sectional view for schematically illustrating the method of manufacturing a modeled article according to the one embodiment of the present invention.
Figure 5E:
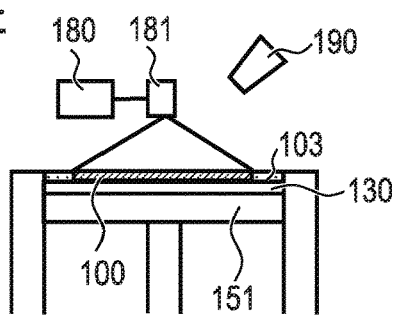
FIG. 5E is a schematic sectional view for schematically illustrating the method of manufacturing a modeled article according to the one embodiment of the present invention.
Figure 5F:
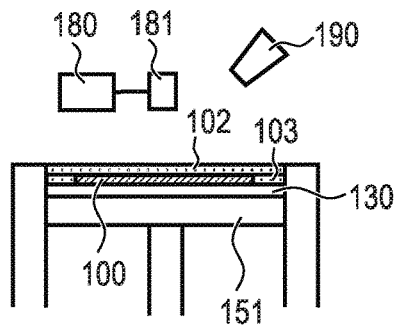
FIG. 5F is a schematic sectional view for schematically illustrating the method of manufacturing a modeled article according to the one embodiment of the present invention.
Figure 5G:
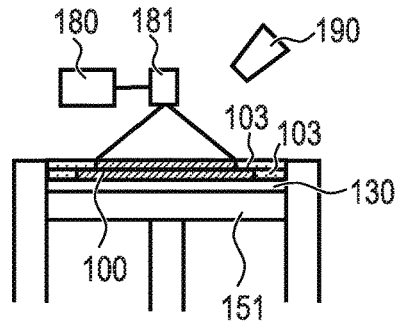
FIG. 5G is a schematic sectional view for schematically illustrating the method of manufacturing a modeled article according to the one embodiment of the present invention.
Figure 5H:
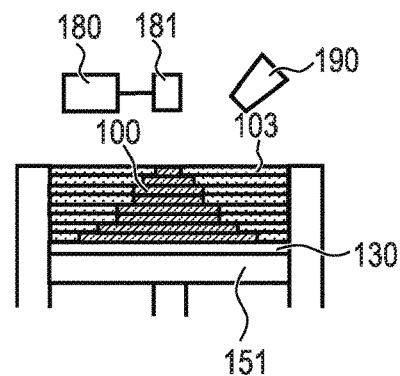
FIG. 5H is a schematic sectional view for schematically illustrating the method of manufacturing a modeled article according to the one embodiment of the present invention.
Figure 5I:
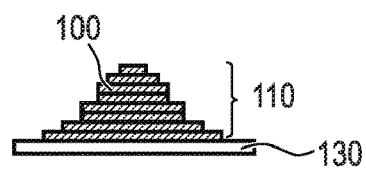
FIG. 5I is a schematic sectional view for schematically illustrating the method of manufacturing a modeled article according to the one embodiment of the present invention.

The flow lines (1), (2), (3), and (7) are flow lines for performing the step (i), the step (ii), and the step (iii) again after the step (iv). The step (iv) is performed on the intermediate modeled article in the middle of forming the final intermediate modeled article. Repeating the step (i), the step (ii), the step (iii), and the step (iv) "q" times ("q" represents a natural number) in the stated order is expressed as [step (i)→step (ii)→step (iii)→step (iv)]$^q$. An example in which the flow lines (1), (2), (3), and (7) are applied to the powder bed direct modeling system is illustrated in FIG. 5A to FIG. 5I. First, the powder 101 is placed on the base 130, and the powder layer 102 is formed through use of the roller 152 (FIG. 5A and FIG. 5B). This operation corresponds to the step (i). Next, when the surface of the powder layer 102 is irradiated with the energy beam emitted from the energy beam source 180 while being scanned with the scanner portion 181, the powder is melted and then solidified to form the modeled article 100 (FIG. 5C). This operation corresponds to the step (ii). Next, a zirconium component-containing liquid is sprayed from the liquid jet nozzle 190 onto the intermediate modeled article 100 (FIG. 5D). This operation corresponds to the step (iii). Subsequently, the modeled article 100 impregnated with the zirconium component-containing liquid is irradiated with the energy beam to heat the modeled article 100. This operation corresponds to the step (iv) (FIG. 5E). Next, the stage 151 is lowered, and the powder layer 102 is newly formed on the above-mentioned modeled article 100 (FIG. 5F). This operation corresponds to the step (i). A series of those steps are repeatedly performed to form the modeled article 110 having a desired shape (FIG. 5H and FIG. 5I). Thus, the effects of the present invention can be obtained even when the step (iv) is performed on the modeled article in the middle of modeling through the flow line (7).

Each of the steps (i) to (iv) may be repeatedly performed any number of times by arbitrarily adding the flows of (4), (5), (6), and (7) to the flow lines (1), (2), and (3).

Ceramic Article

It is preferred that the ceramic article of the present invention have a phase separation structure formed of at least three phases of an X-phase, a Y-phase, and a Z-phase, and the materials forming the above-mentioned three phases have a eutectic relationship. In particular, it is preferred that an average particle diameter "x" of the grains forming the above-mentioned X-phase, an average particle diameter "y" of the grains forming the above-mentioned Y-phase, and an average particle diameter "z" of the grains forming the above-mentioned Z-phase satisfy relationships of $z/x<0.5$ and $z/y<0.5$. In the present invention, the average particle diameter refers to an average value of circle-equivalent diameters of crystal grains observed in a cross-section of a ceramic modeled article.

The ceramic modeled article of the present invention having a phase separation structure of a three-phase eutectic including an X-phase, a Y-phase, and a Z-phase has excellent mechanical strength, for example, a three-point bending strength of 30 MPa or more because the extension of cracks and the like is suppressed. In particular, when the Z-phase having an average particle diameter smaller than those of the other two phases is present in a modeled article in a ratio of a certain value or more, a ceramic modeled article having more excellent mechanical strength, for example, a three-point bending strength of 100 MPa or more is obtained.

In a ceramic modeled article in which the respective particle diameters "x" and "y" of the X-phase and the Y-phase and the particle diameter "z" of the Z-phase have relationships of $z/x<0.5$ and $z/y<0.5$, it is considered that the Z-phase having a relatively small particle diameter as compared to the other phases serves to connect the other phases each having a relatively large particle diameter to each other. Therefore, the modeled article has excellent workability (stickiness) with few chips during machining while having high mechanical strength. In addition, the wear resistance is improved. From this viewpoint, more preferred relationships of "x", "y", and "z" are $z/x<0.35$ and $z/y<0.35$.

It is preferred that the particle diameters of the X-phase and the Y-phase be large to some extent because the porosity of the modeled article can be reduced to increase denseness. From this viewpoint, "x" and "y" are preferably 3 μm or more, more preferably 5 μm or more. Meanwhile, in order to obtain sufficient mechanical strength, "x" and "y" are preferably 30 μm or less. In addition, when the particle diameters of "x" and "y" fall within the above-mentioned ranges, the ceramic modeled article of the present invention can have more excellent workability.

In order to obtain more excellent workability, "z" is preferably smaller, specifically less than 5 μm. More preferred "z" is less than 3 μm.

It is preferred that the ceramic modeled article of the present invention be produced by applying the above-mentioned manufacturing method of the present invention.

A preferred combination of the three phases is a phase containing $Al_2O_3$ as a main component, a phase containing a rare earth aluminate as a main component, and a phase containing $ZrO_2$ as a main component. $Al_2O_3$, the rare earth aluminate, and $ZrO_2$ have a eutectic relationship, and a complicated phase separation structure formed of three phases can be stably formed.

As preferred rare earths forming the rare earth aluminate, there are given, for example, gadolinium, yttrium, and terbium, and as the rare earth aluminate, $GdAlO_3$, $Y_3Al_5O_{12}$, and the like are preferred. The crystal structure of each phase slightly varies depending on the manufacturing process, but it is preferred that each phase of the three-phase eutectic have the above-mentioned crystal structure. As a preferred embodiment, a method of manufacturing a ceramic article formed of a three-phase eutectic including a phase containing $Al_2O_3$ as a main component (corresponding to the X-phase), a phase containing $GdAlO_3$ as a main component (corresponding to the Y-phase), and a phase containing $ZrO_2$ having a fluorite structure as a main component (corresponding to the Z-phase) is mainly described.

$Al_2O_3$ powder and $Gd_2O_3$ powder are mixed preferably so as to have a eutectic composition to obtain mixed powder. The above-mentioned mixed powder is arranged on a base (corresponding to the step (i)) and irradiated with an energy beam to be melted and solidified to obtain a modeled article (corresponding to the step (ii)). Although depending on the irradiation condition of the energy beam, the modeled article thus formed includes two phases of $Al_2O_3$—$GdAlO_3$ at least partially. In addition, microcracks are formed in the modeled article. The modeled article is caused to absorb a zirconium component-containing liquid to distribute a zirconium component in the microcrack portion of the modeled article (corresponding to the step (iii)). Then, it is preferred that the modeled article be heated at a temperature which is equal to or higher than the three-phase eutectic point of $Al_2O_3$—$GdAlO_3$—$ZrO_2$, and which is lower than the two-phase eutectic point of $Al_2O_3$—$GdAlO_3$ (corresponding to the step (iv)). For example, in the case of this material system, it is preferred to heat the modeled article at a temperature of about 1,650° C. or more and about 1,710° C. or less. When the modeled article is heated within such temperature range, only the microcrack portion is melted to reduce the microcracks, and the zirconium component is diffused into the crystal of the modeled article, while the shape of the modeled article is maintained. Then, the modeled article is recrystallized under a state of having incorporated the zirconium component therein, and a three-phase eutectic modeled article of a phase containing $ZrO_2$ having a fluorite structure as a main component, a phase containing $Al_2O_3$ as a main component, and a phase containing $GdAlO_3$ as a main component is obtained.

The average particle diameter of the grains forming each of the phase containing, as a main component, $Al_2O_3$ that has been originally present in the modeled article before undergoing the heating step of the step (iv) and the phase containing $GdAlO_3$ as a main component is increased by heating. However, the average particle diameter of the grains forming the phase containing $ZrO_2$ as a main component, which is formed for the first time in the step (iv), is smaller than the average particle diameters of the other two phases. In this manner, when the phase containing $ZrO_2$ as a main component, which has an average particle diameter smaller than those of the other phases, is formed in the modeled article, the bonding force between the crystal structures of the modeled article is increased, and the wear resistance of the modeled article is significantly improved. In addition, a modeled article having high machinability, which is capable of being subjected to precise finishing with few chips of grains, is obtained.

In contrast, in the related-art process, such as a process involving mixing and forming raw material powder of a material forming a modeled article and sintering the resultant by heating, it is difficult to cause a clear particle diameter difference of three phases as described above under a dense state in which the raw material powder is melted and solidified. That is, it is considered that a ceramic article like the present invention cannot be manufactured by the related-art sintering process.

In addition, when an attempt is made to melt the powder forming the modeled article in order to increase the density of the modeled article produced by the related-art sintering process or to generate a fine eutectic structure in the modeled article, it is required to melt the entire powder, with the result that edges of the modeled article become rounded, and a fine shape is lost.

From the above-mentioned viewpoints, it is important that the powder be melted by irradiation with an energy beam and solidified to produce a modeled article having microcracks that communicate to the inside, and the modeled article be heated after components forming a eutectic with constituent materials of the modeled article are caused to spread to the microcrack portion.

Figure 9A:
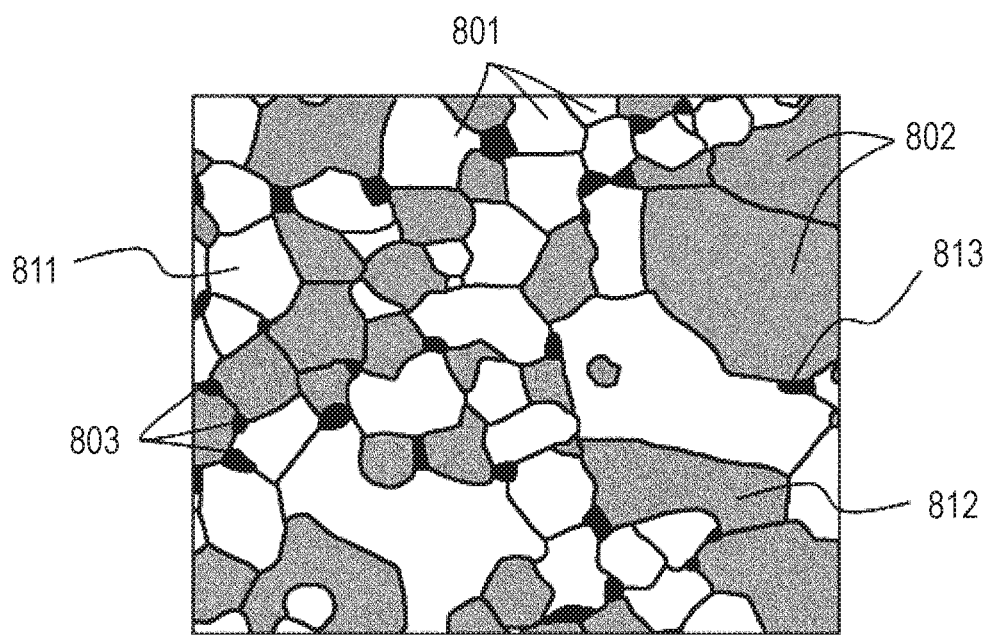
FIG. 9A is a sectional view for schematically illustrating a ceramic modeled article according to one embodiment of the present invention.
Figure 9B:
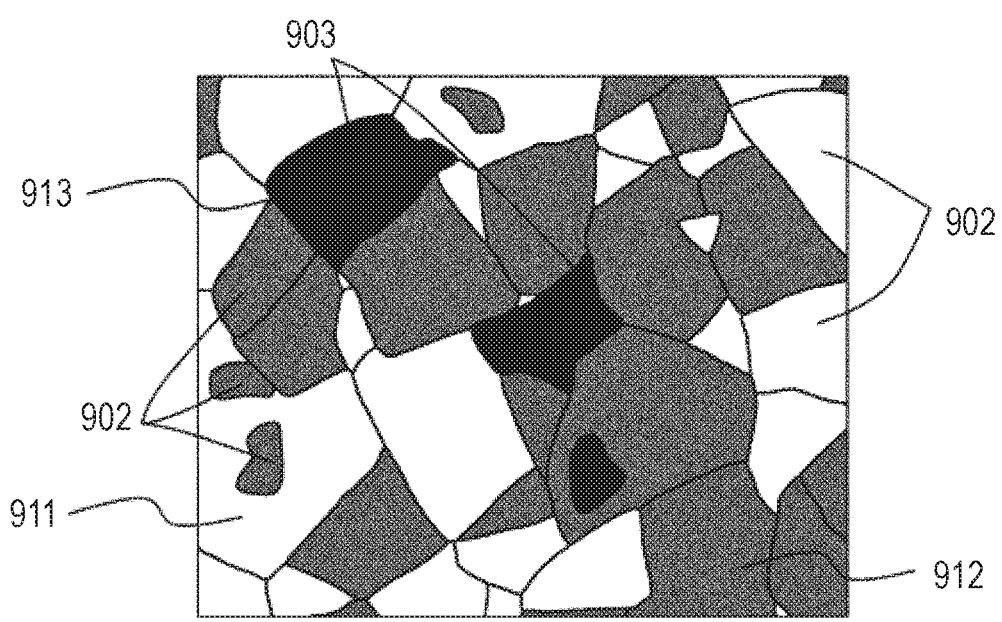
FIG. 9B is a sectional view for schematically illustrating a related-art ceramic article.

FIG. 9A is a diagram for schematically illustrating a phase separation structure and a magnitude relationship of crystal grains forming each of phases, which are observed in the cross-section of the ceramic article of the present invention. The ceramic article of the present invention has a phase separation structure formed of three phases of an X-phase 801, a Y-phase 802, and a Z-phase 803, and crystal grains 811 forming the X-phase and crystal grains 812 forming the Y-phase each have an average particle diameter larger than that of crystal grains 813 forming the Z-phase. In contrast, FIG. 9B is a diagram for schematically illustrating a state of a cross-section of a related-art ceramic article obtained by mixing and forming raw material powder and sintering the resultant by heating. The related-art ceramic article has a phase separation structure of a three-phase eutectic, but there is no large difference between particle diameters of crystal grains forming the respective phases. Ceramics having such configuration are not excellent in machinability and cannot exhibit the effects of the present invention. As described above, a ceramic modeled article formed of a three-phase eutectic including a phase containing $Al_2O_3$ as a main component, a phase containing a rare earth aluminate as a main component, and a phase containing $ZrO_2$ as a main component is preferred because, with this, a complicated phase separation structure is stably formed by the manufacturing method of the present invention. The most preferred ceramic modeled article is a modeled article in which the phase containing $Al_2O_3$ as a main component is the X-phase, the phase containing a rare earth aluminate as a main component is the Y-phase, and the phase containing $ZrO_2$ as a main component is the Z-phase.

The modeled article having such phase separation structure may be produced by first producing a modeled article so as to include a two-phase eutectic of $Al_2O_3$-rare earth aluminate, and then causing a zirconium component to spread to a microcrack portion of the modeled article, followed by heating at a temperature which is equal to or higher than a three-phase eutectic point of $Al_2O_3$-rare earth aluminate-$ZrO_2$, and which is lower than a two-phase eutectic point of $Al_2O_3$-rare earth aluminate.

The modeled article in which the phase containing $Al_2O_3$ as a main component is the X-phase, the phase containing a rare earth aluminate as a main component is the Y-phase, and the phase containing $ZrO_2$ as a main component is the Z-phase has a three-phase eutectic point of 1,600° C. or more and 1,700° C. or less. When the three-phase eutectic point of the ceramic modeled article is 1,700° C. or less, a sufficient soaking property is obtained in the modeled article during heating corresponding to the step (iv). Therefore, only the microcrack portion of the entire modeled article can be locally melted, and the effect of improving the mechanical strength while maintaining the shape of the modeled article can be obtained. Further, it is preferred that the three-phase eutectic point be 1,600° C. or more because a ceramic article required to have heat resistance can be produced.

In the case of the ceramic modeled article formed of a three-phase eutectic including a phase containing $Al_2O_3$ as a main component, a phase containing a rare earth aluminate as a main component, and a phase containing $ZrO_2$ as a main component, a combination of materials corresponding to the X-phase, the Y-phase, and the Z-phase of the ceramic modeled article is not limited.

For example, the modeled article having the above-mentioned phase separation structure may be produced by producing a modeled article so as to include a two-phase eutectic of rare earth aluminate-$ZrO_2$, and then causing an aluminum component to spread to the inside of the above-mentioned modeled article, followed by heating. In this case, the two phases of rare earth aluminate-$ZrO_2$ form the X-phase and the Y-phase each having a relatively large particle diameter, and $Al_2O_3$ forms the Z-phase having a relatively small particle diameter. Thus, the ceramic article having the effects of the present invention can be obtained.

In addition, the modeled article having the above-mentioned phase separation structure may be produced by producing a modeled article so as to include a two-phase eutectic of $Al_2O_3$—$ZrO_2$, and then causing the rare earth component to spread to the inside of the above-mentioned modeled article, followed by heating. In this case, the two phases of $Al_2O_3$—$ZrO_2$ form the X-phase and the Y-phase each having a relatively large particle diameter, and the rare earth aluminate forms the Z-phase having a relatively small particle diameter. Thus, the ceramic article having the effects of the present invention can be obtained.

It is preferred that the Z-phase be a metal oxide having a fluorite structure.

With this, the effect of improving the wear resistance and workability described above is easily obtained. In addition, it is preferred that the Z-phase contain a rare earth element because the Z-phase is stably formed. It is more preferred that the ratio of the rare earth element contained in the Z-phase be 0.20 mol or more and 0.40 mol or less with respect to 1 mol of other metal elements contained in the Z-phase because a Z-phase having sufficient temperature stability can be obtained. The ratio of the rare earth element contained in the Z-phase is still more preferably 0.25 mol or more and 0.35 mol or less.

It is preferred that the main component of the Z-phase be zirconium oxide or hafnium oxide. When the Z-phase contains zirconium oxide and hafnium oxide, a modeled article having high mechanical strength is obtained. In the case where the Z-phase contains zirconium oxide and hafnium oxide as main components, when the zirconium element and the hafnium element are contained at 0.2 mol % or more in the metal elements forming the ceramic modeled article, a sufficient amount of the Z-phase is formed in the ceramic modeled article, and the effect of improving the wear resistance and the workability is obtained. It is preferred that the zirconium element and the hafnium element be contained at less than 3 mol % in the metal elements forming the ceramic modeled article because an increase in particle diameter of the Z-phase can be suppressed.

In the foregoing, description is given by taking, as examples, the modeling using powder containing aluminum oxide as a main component and the three-dimensional object containing aluminum oxide as a main component, but the present invention is not limited to the case in which a main component is aluminum oxide. With a ceramic material of a three-phase eutectic system, the ceramic modeled article of the present invention can be produced. Specifically, first, a modeled article is produced from powder of materials having a two-phase eutectic relationship. Then, a component having a three-phase eutectic relationship with the above-mentioned materials having a two-phase eutectic relationship is caused to spread to the microcrack portion of the above-mentioned modeled article, and the resultant is heated at a temperature which is equal to or higher than a three-phase eutectic point, and which is lower than a eutectic point of two phases that have been originally contained in the modeled article. Thus, the ceramic modeled article of the present invention can be produced.

Evaluation Method

The mechanical strength of the modeled article may be evaluated by a three-point bending strength test based on R1601, which is JIS standards for a room temperature bending strength test of fine ceramics. The three-point bending strength was calculated through use of $3 \times P \times L/(2 \times w \times t^2)$ (Expression 1), where P [N] represents a maximum load when a test piece is broken, L [mm] represents a distance between external fulcrums, "w" [mm] represents a width of the test piece, and "t" [mm] represents a thickness of the test piece.

The wear resistance of the modeled article may be evaluated based on the depletion rate of the modeled article when the modeled article is cut away under a certain condition. A depletion rate D is an amount cutaway per unit time, and may be expressed as, for example, D [mm$^3$/min]. When the depletion rate D is smaller, the wear resistance is more excellent. The machinability of the modeled article may be evaluated based on the number of chipped portions (chipping) in an edge portion of a cut surface when the modeled article is cut away under a certain condition.

A relative density [%] was calculated by dividing a bulk density (weight divided by a volume) of the modeled article by a theoretical density. The theoretical density was calculated from the crystal structure. The crystal structure was identified by performing Rietveld analysis through X-ray diffraction measurement.

The phase forming the ceramic modeled article may be examined by X-ray diffraction, electron beam diffraction, or the like. In particular, through use of a combination of an electron backscatter diffraction (EBSD) detector provided in a scanning electron microscope (SEM) and an energy dispersive X-ray spectroscopy (EDX) detector, the phase separation structure and the crystal grains may be analyzed. A small phase, such as the Z-phase, may be analyzed for composition and crystal structure through use of a transmission electron microscope (TEM).

The average particle diameter of the crystal grains forming the phase may be obtained by observing 300 or more crystal grains in the same phase in a cross-section of the modeled article by the EBSD or the like and calculating an average value of circle-equivalent diameters of the respective crystal grains.

Further, the amount of the powder and the metal elements forming the modeled article and the like may be measured through use of SEM-EDX, TEM-EDX, electron beam diffraction, inductively coupled plasma atomic emission spectroscopy (ICP-AES), inductively coupled plasma mass spectrometry (ICP-MS), X-ray fluorescence analysis (XRF), or the like.

EXAMPLES

Now, the method of manufacturing a modeled article according to the present invention is described in detail by way of Examples, but the present invention is not limited to Examples below.

Example 1

Step (i) and Step (ii)

$\alpha$-Al$_2$O$_3$ powder having an average particle diameter of about 20 µm, Gd$_2$O$_3$ powder having an average particle diameter of about 35 µm, and Tb$_2$O$_{3.5}$ powder (Tb$_4$O$_7$ powder) having an average particle diameter of about 5 µm were prepared, and the powders were weighed so that the molar ratio was Al$_2$O$_3$:Gd$_2$O$_3$:Tb$_2$O$_{3.5}$=77.4:20.8:1.8. The weighed powders were mixed with a dry ball mill for 30 minutes to obtain mixed powder (raw material powder). The average particle diameter in the Example 1 is a median diameter, which is a particle diameter (D$_{50}$) in which cumulative frequency is 50%.

When the composition of the above-mentioned raw material powder was analyzed by ICP emission spectroscopic analysis, the content of zirconium oxide was less than 1 mol %.

Next, a modeled article of Example 1 was produced through the same steps as those illustrated in FIG. 1A to FIG. 1H described above.

For formation of the modeled article, ProX DMP 100 (product name) manufactured by 3D SYSTEMS, having a 50 W fiber laser (beam diameter: 65 m) mounted thereon, was used.

Figure 6A:
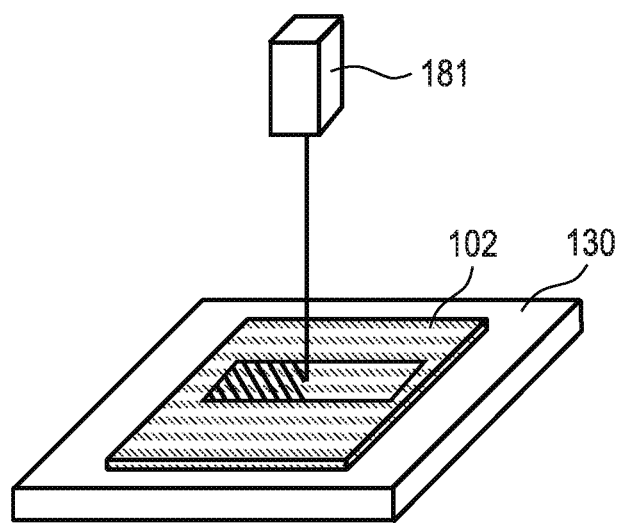
FIG. 6A is a schematic perspective view for illustrating a laser irradiation process in Examples of the present invention.

First, a first powder layer having a thickness of 20 µm formed of the above-mentioned raw material powder was formed on an alumina base through use of a roller (step (i)). Then, the above-mentioned powder layer was irradiated with a laser beam of 30 W to melt and solidify material powder in a rectangular region of 5 mm×42 mm. The drawing speed was set to from 100 mm/s to 140 mm/s, and the drawing pitch was set to 100 µm. In addition, as illustrated in FIG. 6A, drawing lines were each positioned at an angle of 45° with respect to each side of the rectangle.

Figure 6B:
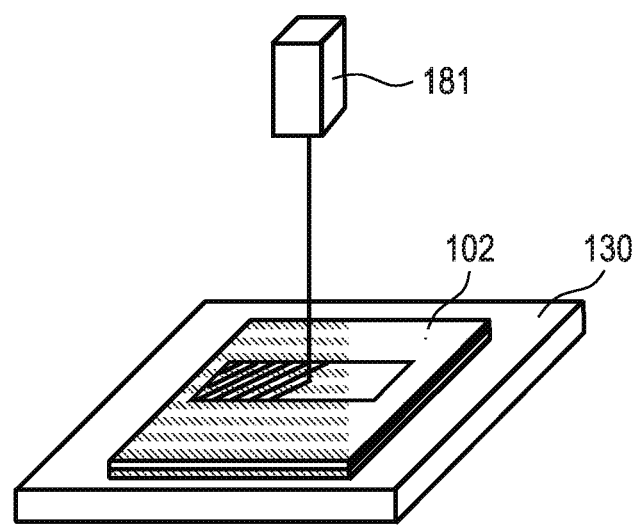
FIG. 6B is a schematic perspective view for illustrating the laser irradiation process in Examples of the present invention.

Under the above conditions, the above-mentioned powder layer was irradiated with a laser beam to melt and solidify the powder in the rectangular region of 5 mm×42 mm (step (ii)). Next, a powder layer having a thickness of 20 µm was newly formed with the roller so as to cover the above-mentioned melted and solidified portion (step (i)). As illustrated in FIG. 6B, the powder layer right above the above-mentioned rectangular region was irradiated with a laser under a state in which the laser was orthogonal to the drawing lines of the first layer, to thereby melt and solidify the powder in the region of 5 mm×42 mm (step (ii)). Such steps were repeated to produce a prismatic modeled article having a bottom surface of 5 mm×42 mm and a height of 6 mm for use in a three-point bending strength test. Through the similar steps, a prismatic modeled article having a square bottom surface measuring 6 mm per side and a height of 6 mm was also produced for a wear resistance test. When the surface of each of those modeled articles was observed with an optical microscope, irregularities on the surface of each of the modeled articles were 30 µm or less.

Figure 7A:
FIG. 7A is a schematic perspective view for illustrating a modeled article according to Examples of the present invention.
Figure 7B:
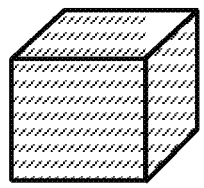
FIG. 7B is a schematic perspective view for illustrating the modeled article according to Examples of the present invention.

Each of the above-mentioned modeled articles was cutoff from the alumina base and polished to obtain a modeled article of W40 mm×D4 mm×H3 mm for a three-point bending strength test (FIG. 7A) and a modeled article of W5 mm×D5 mm×H5 mm for a wear resistance test (FIG. 7B).

Step (iii) and Step (iv)

The zirconium component-containing liquid was prepared as described below. A solution in which 85 wt % of zirconium butoxide (zirconium(IV) butoxide (hereinafter referred to as "Zr(O-n-Bu)$_4$") was dissolved in 1-butanol was prepared. The above-mentioned solution of Zr(O-n-Bu)$_4$ was dissolved in 2-propanol (IPA), and ethyl acetoacetate (EAcAc) was added to the resultant as a stabilizer. The molar ratio of each component was set to Zr(O-n-Bu)$_4$:IPA: EAcAc=1:15:2. Then, the resultant was stirred at room temperature for about 3 hours to prepare a zirconium component-containing liquid.

When the above-mentioned zirconium component-containing liquid is heated in the atmosphere, zirconium oxide is generated.

The above-mentioned modeled article processed for the test was immersed in the zirconium component-containing liquid and degassed under reduced pressure for 1 minute to be impregnated with the liquid up to the inside of the modeled article, followed by natural drying for 1 hour (step (iii)).

Subsequently, the modeled article impregnated with the zirconium component-containing liquid was put in an electric furnace and heated. The temperature was increased to 1,670° C. in the atmospheric atmosphere in 2.5 hours and kept at 1,670° C. for 50 minutes. After that, the energization was completed, and the modeled article was cooled to 200° C. or less in 1.5 hours (step (iv)).

In Example 1, the step of impregnating the modeled article with the zirconium component-containing liquid (step (iii)) and the heat treatment step (step (iv)) were each repeated four times alternately. Then, three modeled articles of W40 mm×D4 mm×H3 mm were produced for a three-point bending strength test. One modeled article that was the same as that for a strength test was produced for evaluation of a composition and a structure. One modeled article of W5 mm×D5 mm×H5 mm was produced for a wear resistance test.

Evaluation

A compression tester manufactured by Instron was used for the three-point bending strength test. When the three modeled articles of W40 mm×D4 mm×H3 mm of Example 1 were tested, the average value of the three-point bending strength was 159.15 MPa.

The wear resistance was evaluated by the following procedure. The modeled article of W5 mm×D5 mm×H5 mm of Example 1 was placed on a #600 diamond polishing disc (manufactured by Musashino Denshi, Inc.) configured to rotate at 80 rpm and cut with a load of 0.5 kg. The depletion rate was 1.03 [mm$^3$/min].

The machinability was evaluated by investigating the number of chipped portions formed in an edge of a cut surface during evaluation of wear resistance. Specifically, an arbitrary one side of 5 mm of the cut surface was observed with an optical microscope, and the number of the chipped portions in the above-mentioned one side was investigated. As the number of chipped portions, the number of chipped portions each having a maximum chip width in a direction parallel to the above-mentioned one side of 50 m or more and a maximum chip width in a direction perpendicular to the above-mentioned one side of 50 m or more was counted. The machinability was evaluated by ranking a case in which the number of chipped portions was 0 as A, a case in which the number of chipped portions was 1 or more and 3 or less as B, and a case in which the number of chipped portions was 4 or more as C. The number of chipped portions in Example 1 was 0, and hence the machinability was excellent and was ranked as A.

Further, the modeled article was polished to a mirror surface, and a crystal structure and a composition of each of phases forming the modeled article were examined by X-ray diffraction, electron beam diffraction, SEM-EDX and TEM-EDX, and a phase separation structure and an average particle diameter of crystal grains forming each of the phases were analyzed by SEM-EBSD.

The modeled article of Example 1 was formed of the following three phases: a phase containing $Al_2O_3$, a phase containing $GdAlO_3$, and a phase containing zirconium oxide having a fluorite structure as a main component. The average particle diameters of the crystal grains forming the respective phases of the phase containing $Al_2O_3$, the phase containing $GdAlO_3$, and the phase containing zirconium oxide having a fluorite structure as a main component were 8.3 μm, 9.5 μm, and 1.6 μm, respectively. The main metal elements forming the phase containing zirconium oxide having a fluorite structure as a main component were Zr, Gd, and Tb, and the content of the metal elements other than Zr, Gd, and Tb was less than 1 mol %. In addition, the ratio of a rare earth element was 30 mol % on average in the metal elements contained in the phase containing zirconium oxide having a fluorite structure as a main component.

The ICP-AES analysis and ICP-MS analysis of the modeled article were performed to investigate the amount of a Zr element contained in the modeled article. The amount of the Zr element was 0.9 mol % in the metal elements forming the modeled article of Example 1.

Examples 2 to 5

Step (i) and Step (ii)

An intermediate modeled article of W40 mm×D4 mm×H3 mm for a three-point bending strength test and an intermediate modeled article of W5 mm×D5 mm×H5 mm for a wear resistance test were produced by using same raw material powder in the same manner as in Example 1. When the surface of each of the intermediate modeled articles of Examples 2 to 5 was observed with an optical microscope, irregularities on the surface of the modeled article were 30 μm or less.

Step (iii) and Step (iv)

In those steps, the same zirconium component-containing liquid as that in Example 1 was used. The step of immersing the modeled article in the zirconium component-containing liquid (step (iii)) and the step of heating the modeled article impregnated with the zirconium component-containing liquid (step (iv)) were also performed under the same conditions as those in Example 1. In Example 2, the step (iii) and the step (iv) were each performed once in the stated order. In Example 3, the step (iii) and the step (iv) were each repeated twice alternately. In Example 4, the step (iii) and the step (iv) were each repeated three times alternately. In Example 5, the step (iii) and the step (iv) were each repeated five times alternately. Thus, in each of Examples 2 to 5, four modeled articles of W40 mm×D4 mm×H3 mm and one modeled article of W5 mm×D5 mm×H5 mm were obtained.

In the same manner as in Example 1, in each of the modeled articles of Examples 2 to 5, a three-point bending strength, a depletion rate, a relative density, and machinability were evaluated, and a crystal structure and a composition of each of phases forming the modeled article, and a phase separation structure and an average particle diameter of crystal grains forming each of the phases were analyzed.

The measurement evaluation results of the three-point bending strength, the depletion rate, the relative density, and the machinability in Examples 2 to 5 are shown in Table 1 together with the results of Example 1.

The modeled articles of Examples 2 to 5 were each formed of the following three phases: a phase containing $Al_2O_3$, a phase containing $GdAlO_3$, and a phase containing zirconium oxide having a fluorite structure as a main component. The phase containing $Al_2O_3$ of the modeled article of each of Examples, the phase containing $GdAlO_3$ thereof, and the phase containing zirconium oxide having a fluorite structure as a main component thereof are hereinafter referred to as "X1-phase", "Y1-phase", and "Z1-phase", respectively. In each of Examples, average particle diameters of the crystal grains forming the X1-phase, the Y1-phase, and the Z1-phase are represented by x1, y1, and z1, respectively. The analysis results of a ratio of a rare earth element in the metal elements contained in the Z1-phase and a ratio of a Zr element in the metal elements forming the modeled article are shown in Table 2 together with the results of Example 1.

Comparative Example 1

Four modeled articles of W40 mm×D4 mm×H3 mm and one modeled article of W5 mm×D5 mm×H5 mm were produced by using same raw material powder in the same manner as in Example 1 except that the step of immersing the modeled article in the zirconium component-containing liquid (step (iii)) and the step of heating the modeled article impregnated with the zirconium component-containing liquid (step (iv)) were not performed.

In the same manner as in Example 1, in the modeled article of Comparative Example 1, a three-point bending strength, a depletion rate, a relative density, and machinability were evaluated, and a crystal structure and a composition of each of phases forming the modeled article, and a phase separation structure and an average particle diameter of crystal grains forming each of the phases were analyzed.

The measurement evaluation results of the three-point bending strength, the depletion rate, the relative density, and the machinability are shown in Table 1.

The modeled article of Comparative Example 1 was formed of a phase containing $Al_2O_3$, a phase containing $GdAlO_3$, and an amorphous phase having composition fluctuation. Those phases do not have a three-phase eutectic relationship. In addition, there was no phase containing zirconium oxide having a fluorite structure as a main component.

Comparative Example 2

A modeled article of W40 mm×D4 mm×H3 mm for a three-point bending strength test and a modeled article of W5 mm×D5 mm×H5 mm for a wear resistance test were produced by using same raw material powder in the same manner as in Example 1 except that the step of impregnating the modeled article with the zirconium component-containing liquid was not performed. Only the step of immersing the modeled article in the zirconium component-containing liquid (step (iii)) was omitted, and the modeled article was put in an electric furnace to be subjected to heat treatment. The step of increasing the temperature to 1,670° C. in the atmospheric atmosphere in 2.5 hours, keeping the temperature at 1,670° C. for 50 minutes, then, completing the energization, and cooling the modeled article to 200° C. or less in 1.5 hours was repeated three times, to thereby produce four modeled articles of W40 mm×D4 mm×H3 mm and one modeled article of W5 mm×D5 mm×H5 mm for a wear resistance test.

In the same manner as in Example 1, in the modeled article of Comparative Example 2, a three-point bending strength, a depletion rate, a relative density, and machinability were evaluated, and a crystal structure and a composition of each of phases forming the modeled article, and a phase separation structure and an average particle diameter of crystal grains forming each of the phases were analyzed.

The measurement results of the three-point bending strength, the depletion rate, and the relative density are shown in Table 1.

As a result of the analysis, the modeled article of Comparative Example 2 was formed of the following two phases: a phase containing $Al_2O_3$; and a phase containing $GdAlO_3$. There was no phase containing zirconium oxide having a fluorite structure as a main component.

Comparative Example 3

$\alpha$-$Al_2O_3$ powder having an average particle diameter of about 200 nm, $Gd_2O_3$ powder having an average particle diameter of about 200 nm, and $ZrO_2$ powder having an average particle diameter of about 200 nm were prepared, and each powder was weighed so that the molar ratio was $Al_2O_3$:$Gd_2O_3$:$ZrO_2$=75.7:20.3:4.0. Each weighed powder was mixed with a dry ball mill for 30 minutes to obtain mixed powder. A polyvinyl alcohol (PVA) binder dissolved in pure water was added to the mixed powder in an amount of 3 parts by weight with respect to the mixed powder, and mixed in a mortar, followed by drying. Then, the resultant was pulverized and mixed for 10 hours with the dry ball mill to obtain granulated powder. The granulated powder was put in a mold, and was subjected to press forming into a disc shape having a thickness of 3 mm and a diameter of 1 cm. The resultant was increased in temperature to 600° C. in 1 hour in the atmospheric atmosphere and kept at 600° C. for 3 hours. After that, the temperature was increased from 600° C. to 1,650° C. in 2 hours, and the resultant was fired at 1,650° C. for 2 hours. The fired ceramics for comparison had large irregularities, such as waviness, of from 100 μm to 300 μm on a surface and side surfaces. The irregularities of the sintered compact were large. Therefore, a modeled article for evaluation having a shape of W40 mm×D4 mm×H3 mm was not able to be produced in the manufacturing method of Comparative Example 3, and a three-point bending strength test was not able to be performed.

A block of W5 mm×D5 mm×H2 mm was cutout from the above-mentioned disc while the irregularities were excluded, and the same wear resistance test as that in Example 1 was performed on a W5 mm×D5 mm surface.

The evaluation results of a depletion rate, a relative density, and machinability are shown in Table 1.

The ceramic modeled article of Comparative Example 3 was formed of the following three phases: a phase containing $Al_2O_3$, a phase containing $GdAlO_3$, and a phase containing zirconium oxide as a main component. The phase containing $Al_2O_3$ of the ceramics for comparison of Comparative Example 3, the phase containing $GdAlO_3$ thereof, and the phase containing zirconium oxide as a main component thereof are hereinafter referred to as "X2-phase", "Y2-phase", and "Z2-phase", respectively. Average particle diameters x2, y2, and z2 of crystal grains forming the respective phases of the X2-phase, the Y2-phase, and the Z2-phase were 21 μm, 25 μm, and 15 m, respectively. The ratios of the average particle diameter z2 of the crystal grains forming the Z2-phase to the average particle diameters $x2$ and $y2$ of the crystal grains forming the X2-phase and the Y2-phase were $z2/x2=0.71$ and $z2/y2=0.60$, respectively.

TABLE 1

|  | Number of times of repetitions of step (iii) and step (iv) | Relative density [%] | Three-point bending strength [MPa] | Depletion rate [mm³/min] | Machinability |
| --- | --- | --- | --- | --- | --- |
| Example 1 | Four times | 95.78 | 159.15 | 1.03 | A |
| Example 2 | Once | 95.05 | 34.53 | 1.40 | B |
| Example 3 | Twice | 95.19 | 68.74 | 1.33 | B |
| Example 4 | Three times | 95.22 | 125.14 | 1.23 | A |
| Example 5 | Five times | 96.04 | 210.66 | 1.00 | A |
| Comparative Example 1 | 0 times | 94.82 | 19.92 | 2.13 | C |
| Comparative Example 2 | Three times for only step (iv) | 95.20 | 32.08 | 1.95 | C |
| Comparative Example 3 | — | 95.61 | — | 1.62 | C |

TABLE 2

|  | Average particle diameter [µm] | | | | | Content of rare earth element in Z1-phase [mol %] | Content of Zr in modeled article [mol %] |
| --- | --- | --- | --- | --- | --- | --- | --- |
|  | X1-phase (a) | Y1-phase (b) | Z1-phase (c) | $z1/x1$ | $z1/y1$ |  |  |
| Example 1 | 8.3 | 9.5 | 1.6 | 0.19 | 0.17 | 30 | 0.9 |
| Example 2 | 1.9 | 2.0 | 0.8 | 0.42 | 0.40 | 24 | 0.5 |
| Example 3 | 3.4 | 4.7 | 1.2 | 0.35 | 0.26 | 27 | 0.7 |
| Example 4 | 7.4 | 8.0 | 1.5 | 0.20 | 0.19 | 30 | 0.8 |
| Example 5 | 10 | 11 | 1.9 | 0.19 | 0.17 | 31 | 1.1 |

Discussion

Figure 8A:
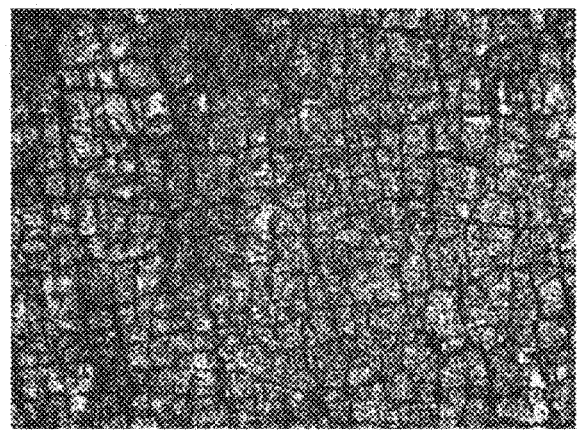
FIG. 8A is an optical microscopic image of a modeled article of Comparative Example 1.
Figure 8B:
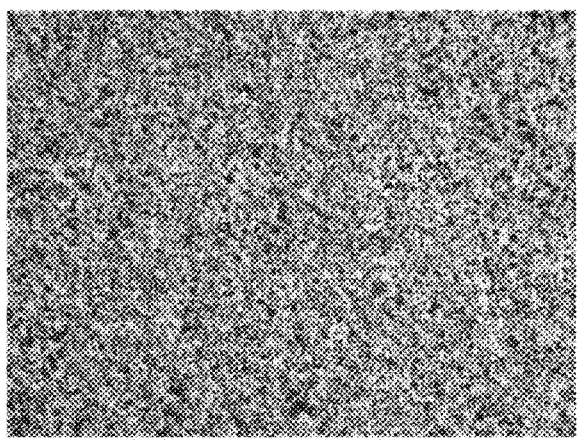
FIG. 8B is an optical microscopic image of the modeled article of Example 1.

FIG. 8A is an optical microscopic image of the modeled article of Comparative Example 1, and FIG. 8B is an optical microscopic image of the modeled article of Example 1. In the modeled article of Example 1 formed by the manufacturing method of the present invention, streak-like microcracks observed in the modeled article of Comparative Example 1 were hardly confirmed, which shows that the microcracks were reduced or eliminated by the manufacturing method of the present invention.

It is understood from the results shown in Table 1 that, in each of the modeled articles of Examples 1 to 5 produced by the manufacturing method of the present invention, the three-point bending strength was significantly improved, and the depletion rate was significantly decreased, as compared to the modeled article of Comparative Example 1. It is understood from the foregoing that, according to the method of manufacturing a modeled article of the present invention, the mechanical strength and wear resistance of the modeled article can be significantly improved.

When Examples 1 to 5 were compared to each other, it was found that, when the step (iii) and the step (iv) were repeated a larger number of times, the three-point bending strength of the modeled article was further improved, and the depletion rate was further reduced. That is, the mechanical strength and the wear resistance were further improved.

In Example 4, the three-point bending strength was significantly improved, and the depletion rate was significantly decreased, as compared to Comparative Example 2 which was different from Example 4 only in that impregnation with the zirconium component-containing liquid was not performed. It is understood from this result that the step (iii) of impregnating the intermediate modeled article with the zirconium component-containing liquid of the present invention greatly contributes to the improvement of the mechanical strength and the wear resistance.

In Examples 1 to 5 satisfying $z1/x1<0.5$ and $z1/y1<0.5$, the machinability and the wear resistance were excellent as compared to those of Comparative Example 3 produced by sintering raw material powder. In particular, the machinability of Examples 1, 4, and 5 satisfying $z1/x1<0.3$ and $z1/y1<0.3$ was ranked as A, which was more excellent than that of Examples 2 and 3 which was ranked as B.

In all Examples, the irregularities on the surface of each of the modeled articles were 30 µm or less. In contrast, in Comparative Example 3, as a result of performing firing at a high temperature close to the eutectic point, a high relative density was able to be obtained due to the occurrence of partial melting, but irregularities of from 100 µm to 300 µm were observed on the surface and side surfaces of the ceramic modeled article. It was found to be difficult to produce a structure having both density and shape accuracy by the manufacturing method of Comparative Example 3 in a three-phase eutectic material system. Thus, it was able to be recognized that the manufacturing method of the present invention enabled modeling with modeling accuracy higher than that of the manufacturing method of Comparative Examples.

As described above, according to the method of manufacturing a modeled article of the present invention, the mechanical strength, wear resistance, and machinability of the modeled article can be improved while high modeling accuracy is obtained. Further, when the number of times of performing the step of causing the modeled article containing aluminum oxide as a main component to absorb the zirconium component-containing liquid and the heat treatment step is adjusted, there can be obtained a ceramic article in which the mechanical strength, the wear resistance, and the machinability are improved in accordance with the application while high modeling accuracy is achieved.

Subsequently, through use of the mixed powder of silicon oxide and terbium oxide as the raw material powder, modeling of Examples 6 to 9 was performed and evaluated.

Examples 6 and 7

Step (i) and Step (ii)

$SiO_2$ powder having an average particle diameter of about 38 µm and $Tb_2O_{3.5}$ powder ($Tb_4O_7$ powder) having an average particle diameter of 4 µm were prepared, and the powders were weighed so that the molar ratio was $SiO_2$:$Tb_2O_{3.5}$=98.4:1.6. The weighed powders were mixed with a dry ball mill for 30 minutes to obtain mixed powder (raw material powder).

Next, modeled articles of Examples 6 and 7 were produced through the same steps as those in Example 1 through use of the same apparatus as that in Example 1. However, the laser irradiation conditions were changed such that the laser beam output was 47.5 W, the drawing speed was 60 mm/s, and the drawing pitch was 80 μm.

Forming the powder layer (step (i)) and irradiating a rectangular region of 5 mm×42 mm of the powder layer with a laser beam to melt and solidify powder based on the slice data for forming a porous material having a porosity of 20% (step (ii)) were repeated. As a result, a modeled article, which had a prismatic shape with a bottom surface of 5 mm×42 mm and a height of 6 mm, and was a porous material having a porosity of about 20%, was obtained. When the surface of the modeled article was observed with an optical microscope, the irregularities on the surface of the modeled article were 30 μm or less.

The produced modeled article was cutoff from the alumina base and polished to obtain a modeled article of W40 mm×D4 mm×H3 mm (FIG. 7A) for a three-point bending strength test.

Step (iii) and Step (iv)

The zirconium component-containing liquid was prepared in the same manner as in the zirconium component-containing liquid used in Example 1.

The modeled article processed for the test was impregnated with the zirconium component-containing liquid and dried naturally (step (iii)) in the same manner as in Example 1.

The modeled article impregnated with the zirconium component-containing liquid was put in an electric furnace and heated. Specifically, the temperature was increased to 1,685° C. in the atmospheric atmosphere in 2.5 hours and kept at 1,685° C. for 50 minutes. After that, the energization was completed, and the modeled article was cooled to 200° C. or less in 1.5 hours (step (iv)).

In Example 6, the step of impregnating the modeled article with the zirconium component-containing liquid (step (iii)) and the heat treatment step (step (iv)) were each performed once to obtain one modeled article for a three-point bending strength test of W40 mm×D4 mm×H3 mm.

In Example 7, the step (iii) and the step (iv) were each repeated twice alternately to obtain one modeled article of W40 mm×D4 mm×H3 mm.

Examples 8 and 9

In the step (iii), modeled articles were produced in the same manner as in Examples 6 and 7 except that an aluminum component-containing liquid was used and the conditions of the step (iv) were changed accordingly.

The aluminum component-containing liquid was prepared as described below.

Aluminum sec-butoxide was dissolved in 2-propanol (IPA), and ethyl acetoacetate (EAcAc) was added to the resultant as a stabilizer. The molar ratio of each component was set to aluminum sec-butoxide:IPA:EAcAc=1:5:2. After that, the resultant was stirred at room temperature for about 3 hours to prepare the aluminum component-containing liquid.

The modeled article processed for the test was immersed in the aluminum component-containing liquid and degassed under reduced pressure for 1 minute so that the liquid permeated up to the inside of the modeled article, followed by natural drying for 1 hour (step (iii)).

The intermediate modeled article impregnated with the aluminum component-containing liquid as described above was put in an electric furnace and heated. Specifically, the temperature was increased to 1,600° C. in the atmospheric atmosphere in 2 hours and kept at 1,600° C. for 30 minutes. After that, the energization was completed, and the modeled article was cooled to 200° C. or less in 1.5 hours (step (iv)).

In Example 8, the step of impregnating the modeled article with the aluminum component-containing liquid (step (iii)) and the heat treatment step (step (iv)) were each performed once to obtain one modeled article for a three-point bending strength test of W40 mm×D4 mm×H3 mm.

In Example 9, the step (iii) and the step (iv) were each repeated twice alternately to obtain one modeled article of W40 mm×D4 mm×H3 mm.

Comparative Example 4

One modeled article for a three-point bending strength test was produced in the same manner as in Example 6 except that the step of impregnating the modeled article with the zirconium or aluminum component-containing liquid (step (iii)) and the subsequent step of heating the modeled article (step (iv)) were not performed.

Evaluation

The three-point bending strength was measured through use of the compression tester manufactured by Instron in the three-point bending strength test in the same manner as in Example 1. The three-point bending strength of each one modeled article of W40 mm×D4 mm×H3 mm of each of Examples 6 to 9 and Comparative Example 4 is shown in Table 3.

TABLE 3

| | Liquid used in step (iii) | Number of times of repetitions of step (iii) and step (iv) | Three-point bending strength [MPa] |
|---|---|---|---|
| Example 6 | Zirconium component-containing liquid | Once | 9 |
| Example 7 | Zirconium component-containing liquid | Twice | 12.1 |
| Example 8 | Aluminum component-containing liquid | Once | 12 |
| Example 9 | Aluminum component-containing liquid | Twice | 20.3 |
| Comparative Example 4 | — | — | 5.5 |

Discussion

In the modeled articles each containing silicon oxide as a main component of Examples 6 to 9 produced by the manufacturing method of the present invention, the three-point bending strength was improved as compared to that of Comparative Example 4. This result shows that the microcracks are reduced or eliminated by impregnating a modeled article, which is produced by irradiating powder containing a silicon oxide as a main component with a laser, with a zirconium or aluminum component-containing liquid, followed by heat treatment.

In the foregoing, modeling using the powder containing aluminum oxide or silicon oxide as a main component is described, but the present invention is not limited thereto.

According to the manufacturing method of the present invention, a ceramic article having high modeling accuracy and mechanical strength enhanced in accordance with the application can be obtained. In addition, the ceramic article according to the present invention can achieve the high wear resistance and machinability, as well as the high mechanical strength corresponding to the application.

INDUSTRIAL APPLICABILITY

According to the present invention, the method of manufacturing a modeled article, which is capable of further improving the mechanical strength, wear resistance, and machinability of a modeled article while directly taking advantage of the features of the direct modeling system capable of obtaining a modeled article having a dense and complicated shape, can be provided. In addition, the ceramic modeled article. which is excellent in mechanical strength, wear resistance, and machinability while maintaining shape accuracy, can be provided.

According to the present invention, the method capable of manufacturing a ceramic article excellent in mechanical strength with high modeling accuracy in the direct modeling system can be provided.

According to the present invention, the mechanical strength of the modeled article can be further improved while the features of the direct modeling system capable of modeling a dense and complicated shape are directly taken advantage of.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method of manufacturing a ceramic article comprising the steps of:
    (i) arranging powder containing ceramics;
    (ii) irradiating the powder with an energy beam to melt and solidify the powder, to thereby obtain a first modeled article;
    (iii) causing the first modeled article to absorb a liquid containing a material and an organic solvent; and
    (iv) heating the first modeled article with the material, to thereby obtain a second modeled article,
    wherein the second modeled article has a first phase and a second phase, the first phase is derived from the ceramics, the second phase is derived from the material, and the first phase is in a eutectic relationship with the second phase.

2. The method according to claim 1, wherein the material is changed to a compound different from the material by the heating in the step (iv).

3. The method according to claim 1, wherein the second modeled article has a third phase, the third phase is derived from the ceramics, and the third phase is in a eutectic relationship with the first phase and the second phase.

4. A method of manufacturing a ceramic article comprising the steps of:
    (i) arranging powder containing ceramics;
    (ii) irradiating the powder with an energy beam to melt and solidify the powder, to thereby obtain a first modeled article;
    (iii) causing the first modeled article to absorb a liquid containing a material; and
    (iv) heating the first modeled article with the material, to thereby obtain a second modeled article,
    wherein the second modeled article has a first phase and a second phase, the first phase is derived from the ceramics, the second phase is derived from the material, and the first phase is in a eutectic relationship with the second phase,
    wherein the first modeled article has at least one phase, and
    wherein, when a melting point of the at least one phase is represented by $T_m$, and a eutectic temperature of the first phase and the second phase is represented by $T_E$, the first modeled article reaches a maximum temperature $T_S$ satisfying $T_E<T_S<T_m$ during the heating in the step (iv).

5. The method according to claim 4, wherein, when a melting point of a compound contained in the second phase is represented by $T_i$, a relationship of $T_m<T_i$, is satisfied.

6. The method according to claim 2, wherein a content of a compound, which is same as the compound to which the material is changed, in the powder is less than 3 mol %.

7. The method according to claim 1, wherein the liquid contains any one selected from the group consisting of a metal alkoxide, a chloride, and a salt compound as the material.

8. The method according to claim 7, wherein the liquid contains the metal alkoxide, and further contains a stabilizer.

9. The method according to claim 8, wherein the stabilizer is any one selected from the group consisting of β-diketone compounds, β-ketoester compounds, and alkanolamines.

10. The method according to claim 4, wherein the powder contains aluminum oxide or silicon oxide.

11. The method according to claim 10, wherein the powder further contains an oxide of a rare earth element.

12. The method according to claim 11, wherein the oxide of the rare earth element is at least one selected from the group consisting of gadolinium oxide, terbium oxide, and praseodymium oxide.

13. The method according to claim 10, wherein the powder contains the silicon oxide, and the material contains a zirconium component or an aluminum component.

14. The method according to claim 10, wherein the powder contains the aluminum oxide, and the material contains a zirconium component.

15. The method according to claim 13, wherein the material contains a zirconium alkoxide.

16. The method according to claim 15, wherein the liquid further contains 2-propanol and ethyl acetoacetate.

17. The method according to claim 13, wherein the step (iii) includes immersing the first modeled article in the liquid containing the zirconium component, and degassing the first modeled article under reduced pressure.

18. A method of manufacturing a ceramic article comprising the steps of:
(i) arranging powder containing ceramics;
(ii) irradiating the powder with an energy beam to melt and solidify the powder, to thereby obtain a modeled article;
(iii) causing the modeled article to absorb a liquid containing a material; and
(iv) heating the modeled article with the material,
wherein the powder contains at least one selected from the group consisting of aluminum oxide and silicon oxide,
wherein the material contains at least one selected from the group consisting of a zirconium component and an aluminum component, and
wherein the heating in the step (iv) has a maximum temperature of 1,600° C. to 1,710° C.

19. The method according to claim 4, wherein the energy beam in the step (ii) is a laser beam or an electron beam.

20. The method according to claim 4, wherein the step (iii) and the step (iv) are repeated a plurality of times after the step (i) and the step (ii) are repeated a plurality of times.

* * * * *